(12) United States Patent
Hodge

(10) Patent No.: US 9,876,900 B2
(45) Date of Patent: *Jan. 23, 2018

(54) DIGITAL TELECOMMUNICATIONS CALL MANAGEMENT AND MONITORING SYSTEM

(71) Applicant: **Global Tel*Link Corporation**, Reston, VA (US)

(72) Inventor: Stephen Hodge, Aubry, TX (US)

(73) Assignee: **Global Tel*Link Corporation**, Reston, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/831,533

(22) Filed: Aug. 20, 2015

(65) Prior Publication Data

US 2015/0358457 A1 Dec. 10, 2015

Related U.S. Application Data

(63) Continuation of application No. 13/949,980, filed on Jul. 24, 2013, now Pat. No. 9,143,609, which is a
(Continued)

(51) Int. Cl.
*H04M 1/64* (2006.01)
*H04M 3/22* (2006.01)
(Continued)

(52) U.S. Cl.
CPC ......... *H04M 3/2281* (2013.01); *H04M 3/385* (2013.01); *H04M 3/42221* (2013.01);
(Continued)

(58) Field of Classification Search
CPC .. H04W 12/06; H04M 3/4365; H04M 3/2281
(Continued)

(56) References Cited

U.S. PATENT DOCUMENTS 4,054,756 A 10/1977 Comella et al.
4,191,860 A 3/1980 Weber
(Continued)

FOREIGN PATENT DOCUMENTS

EP 0585004 A2 3/1994
EP 0989720 A1 3/2000
(Continued)

OTHER PUBLICATIONS

"Bellcore Notes on the Networks (Formerly BOC Notes on the LEC Networks)," Bellcore, Special Report SR-2275, Issue 3, Dec. 1997.
(Continued)

*Primary Examiner* — William Deane, Jr.
(74) *Attorney, Agent, or Firm* — Sterne, Kessler, Goldstein & Fox P.L.L.C.

(57) ABSTRACT

The present invention discloses a centralized, digital, computer-based telephone call management system for authenticating users of a telephone system in an institutional facility. The system includes the capacity to allow an institution to control, record, monitor, and bill and report usage and access to a telephone network. The telephone call management system further includes both accounting and management software for use in controlling, monitoring, billing, recording, and reporting usage and access. Also, it can operate over both a Public Switch Telephone Network (PSTN) and a Voice over Internet Protocol (VOIP) infrastructure.

22 Claims, 4 Drawing Sheets

Related U.S. Application Data continuation of application No. 12/861,322, filed on Aug. 23, 2010, now abandoned, which is a continuation of application No. 11/045,589, filed on Jan. 28, 2005, now Pat. No. 7,783,021.

(51) Int. Cl.

| | | |
|---|---|---|
| *H04M 3/42* | (2006.01) | |
| *H04M 3/38* | (2006.01) | |
| *H04M 15/00* | (2006.01) | |
| *H04M 7/00* | (2006.01) | |

(52) U.S. Cl.
CPC ............ *H04M 15/00* (2013.01); *H04M 7/006* (2013.01); *H04M 2203/301* (2013.01); *H04M 2203/551* (2013.01); *H04M 2203/6054* (2013.01)

(58) Field of Classification Search
USPC .......................... 379/88.02, 114.14; 455/565
See application file for complete search history.

(56) References Cited

U.S. PATENT DOCUMENTS

| | | |
|---|---|---|
| 4,449,189 A | 5/1984 | Feix et al. |
| 4,706,275 A | 11/1987 | Kamil |
| 4,890,317 A | 12/1989 | Hird et al. |
| 4,933,965 A | 6/1990 | Hird |
| 4,935,956 A | 6/1990 | Hellwarth et al. |
| 4,993,068 A | 2/1991 | Piosenka et al. |
| 5,053,774 A | 10/1991 | Schuermann et al. |
| 5,093,855 A | 3/1992 | Vollert et al. |
| 5,170,426 A | 12/1992 | D'Alessio et al. |
| 5,181,238 A | 1/1993 | Medamana et al. |
| 5,185,781 A | 2/1993 | Dowden et al. |
| 5,229,764 A | 7/1993 | Matchett et al. |
| 5,274,695 A | 12/1993 | Green |
| 5,276,444 A | 1/1994 | McNair |
| 5,319,702 A | 6/1994 | Kitchin et al. |
| 5,353,335 A | 10/1994 | Durso et al. |
| 5,420,910 A | 5/1995 | Rudokas et al. |
| 5,473,671 A | 12/1995 | Partridge |
| 5,483,581 A | 1/1996 | Hird et al. |
| 5,485,507 A | 1/1996 | Brown et al. |
| 5,502,759 A | 3/1996 | Cheng et al. |
| 5,511,111 A | 4/1996 | Serbetcioglu et al. |
| 5,513,272 A | 4/1996 | Bogosian, Jr. |
| 5,535,261 A | 7/1996 | Brown et al. |
| 5,535,596 A | 7/1996 | Todack |
| 5,539,812 A | 7/1996 | Kitchin et al. |
| 5,561,718 A | 10/1996 | Trew et al. |
| 5,623,539 A * | 4/1997 | Bassenyemukasa .... H04M 1/66 379/114.14 |
| 5,629,981 A | 5/1997 | Nerlikar |
| 5,638,430 A | 6/1997 | Hogan et al. |
| 5,655,013 A * | 8/1997 | Gainsboro .......... H04M 3/2281 379/188 |
| 5,675,704 A | 10/1997 | Juang et al. |
| 5,696,880 A | 12/1997 | Gustafson |
| 5,715,518 A | 2/1998 | Barrere et al. |
| 5,717,743 A | 2/1998 | McMahan et al. |
| 5,745,558 A | 4/1998 | Richardson, Jr. et al. |
| 5,768,355 A | 6/1998 | Salibrici et al. |
| 5,793,415 A | 8/1998 | Gregory, III et al. |
| 5,796,811 A | 8/1998 | McFarlen |
| 5,805,685 A | 9/1998 | McFarlen |
| 5,809,126 A | 9/1998 | Smith et al. |
| 5,809,462 A | 9/1998 | Nussbaum |
| 5,822,418 A | 10/1998 | Yacenda et al. |
| 5,867,562 A | 2/1999 | Scherer |
| 5,875,236 A | 2/1999 | Jankowitz et al. |
| 5,883,945 A | 3/1999 | Richardson, Jr. et al. |
| 5,893,057 A | 4/1999 | Fujimoto et al. |
| 5,923,746 A | 7/1999 | Baker et al. |
| 5,926,533 A | 7/1999 | Gainsboro |
| 5,937,043 A | 8/1999 | He |
| 5,943,403 A | 8/1999 | Richardson et al. |
| 5,950,167 A * | 9/1999 | Yaker .................. G06F 3/16 704/270 |
| 5,953,652 A | 9/1999 | Amin et al. |
| 5,956,634 A | 9/1999 | Otterson et al. |
| 5,991,429 A | 11/1999 | Coffin et al. |
| 6,052,454 A | 4/2000 | Kek et al. |
| 6,054,928 A * | 4/2000 | Lemelson .......... G08B 21/0233 340/539.1 |
| 6,058,163 A | 5/2000 | Pattison et al. |
| 6,058,173 A | 5/2000 | Penfield et al. |
| 6,064,961 A | 5/2000 | Gainsboro |
| 6,064,963 A | 5/2000 | Gainsboro |
| 6,078,807 A | 6/2000 | Dunn et al. |
| 6,084,967 A | 7/2000 | Kennedy et al. |
| 6,092,192 A | 7/2000 | Kanevsky et al. |
| 6,104,922 A | 8/2000 | Baumann |
| 6,122,239 A | 9/2000 | Bodo et al. |
| 6,122,354 A | 9/2000 | Dowens |
| 6,122,357 A | 9/2000 | Farris et al. |
| 6,141,406 A | 10/2000 | Johnson |
| 6,160,903 A | 12/2000 | Hamid et al. |
| 6,161,090 A | 12/2000 | Kanevsky et al. |
| 6,182,221 B1 | 1/2001 | Hsu et al. |
| 6,185,536 B1 | 2/2001 | Haber et al. |
| 6,213,391 B1 | 4/2001 | Lewis |
| 6,219,439 B1 | 4/2001 | Burger |
| 6,219,640 B1 | 4/2001 | Basu et al. |
| 6,226,362 B1 | 5/2001 | Gerszberg et al. |
| 6,246,751 B1 * | 6/2001 | Bergl ................. G07C 9/00158 379/114.15 |
| 6,246,987 B1 | 6/2001 | Fisher et al. |
| 6,252,947 B1 | 6/2001 | Diamond et al. |
| 6,282,566 B1 | 8/2001 | Lee et al. |
| 6,301,344 B1 | 10/2001 | Meyer et al. |
| 6,327,345 B1 | 12/2001 | Jordan |
| 6,345,252 B1 | 2/2002 | Beigi et al. |
| 6,377,699 B1 | 4/2002 | Musgrave et al. |
| 6,389,397 B1 | 5/2002 | Otto |
| 6,421,645 B1 | 7/2002 | Beigi et al. |
| 6,430,274 B1 | 8/2002 | Winstead et al. |
| 6,442,265 B1 | 8/2002 | Harlow et al. |
| 6,542,602 B1 | 4/2003 | Elazar |
| 6,560,323 B2 | 5/2003 | Gainsboro |
| 6,611,583 B1 | 8/2003 | Gainsboro |
| 6,633,632 B1 | 10/2003 | Harlow et al. |
| 6,647,096 B1 | 11/2003 | Milliorn et al. |
| 6,665,376 B1 | 12/2003 | Brown |
| 6,665,380 B1 | 12/2003 | Cree et al. |
| 6,665,736 B1 | 12/2003 | Fan |
| 6,668,044 B1 | 12/2003 | Schwartz et al. |
| 6,668,045 B1 | 12/2003 | Mow |
| 6,681,205 B1 | 1/2004 | San Martin et al. |
| 6,687,733 B2 | 2/2004 | Manukyan |
| 6,731,744 B1 | 5/2004 | Khuc |
| 6,748,356 B1 | 6/2004 | Beigi et al. |
| 6,765,470 B2 | 7/2004 | Shinzaki |
| 6,766,295 B1 | 7/2004 | Murveit et al. |
| 6,775,269 B1 | 8/2004 | Kacmarczyk et al. |
| 6,785,282 B1 | 8/2004 | Gardner |
| 6,788,772 B2 | 9/2004 | Barak et al. |
| 6,810,480 B1 | 10/2004 | Parker et al. |
| 6,819,219 B1 | 11/2004 | Bolle et al. |
| 6,836,556 B1 | 12/2004 | Bromba et al. |
| 6,853,716 B1 | 2/2005 | Shaffer et al. |
| 6,892,052 B2 | 5/2005 | Kotola et al. |
| 6,920,209 B1 | 7/2005 | Gainsboro |
| 6,950,508 B1 | 9/2005 | Griffiths |
| 6,975,708 B1 | 12/2005 | Scherer |
| 6,978,238 B2 * | 12/2005 | Wohlsen ................. G10L 17/24 704/246 |
| 6,996,216 B2 | 2/2006 | Brown et al. |
| 7,035,386 B1 | 4/2006 | Susen et al. |
| 7,042,987 B2 | 5/2006 | Schwartz et al. |
| 7,042,992 B1 | 5/2006 | Falcone et al. |
| 7,054,430 B2 | 5/2006 | Lynam et al. |
| 7,079,636 B1 | 7/2006 | McNitt et al. |

(56) References Cited

U.S. PATENT DOCUMENTS

| | | |
|---|---|---|
| 7,092,494 B1 | 8/2006 | Anders et al. |
| 7,106,843 B1 | 9/2006 | Gainsboro |
| 7,120,238 B1 | 10/2006 | Bednarz et al. |
| 7,167,551 B2 | 1/2007 | Brown et al. |
| 7,173,532 B2 * | 2/2007 | Hanle ............... G07C 9/00103 340/5.2 |
| 7,181,017 B1 | 2/2007 | Nagel et al. |
| 7,191,133 B1 | 3/2007 | Pettay |
| 7,197,560 B2 | 3/2007 | Caslin et al. |
| 7,245,716 B2 | 7/2007 | Brown et al. |
| 7,278,028 B1 * | 10/2007 | Hingoranee ............ G06F 21/32 713/161 |
| 7,333,798 B2 | 2/2008 | Hodge |
| 7,348,961 B1 | 3/2008 | Shneidman |
| 7,403,766 B2 | 7/2008 | Hodge |
| 7,406,039 B2 | 7/2008 | Cherian et al. |
| 7,437,330 B1 * | 10/2008 | Robinson ............... G06Q 20/04 705/67 |
| 7,466,816 B2 | 12/2008 | Blair |
| 7,486,779 B2 | 2/2009 | Brown et al. |
| 7,494,061 B2 | 2/2009 | Reinhold |
| 7,505,406 B1 | 3/2009 | Spadaro et al. |
| 7,505,573 B2 | 3/2009 | Leonard |
| 7,529,357 B1 | 5/2009 | Rae et al. |
| 7,551,732 B2 | 6/2009 | Anders |
| 7,783,021 B2 | 8/2010 | Hodge |
| 7,805,457 B1 | 9/2010 | Viola et al. |
| 7,844,252 B2 | 11/2010 | Hodge |
| 7,848,510 B2 | 12/2010 | Shaffer et al. |
| 7,853,243 B2 | 12/2010 | Hodge |
| 7,860,222 B1 | 12/2010 | Sidler et al. |
| 7,881,446 B1 | 2/2011 | Apple et al. |
| 7,889,847 B2 | 2/2011 | Gainsboro |
| 7,899,167 B1 | 3/2011 | Rae |
| 7,979,612 B2 | 7/2011 | Kerdemelidis et al. |
| 8,000,269 B1 | 8/2011 | Rae et al. |
| 8,098,804 B1 | 1/2012 | Rae et al. |
| 8,135,115 B1 | 3/2012 | Hogg et al. |
| 8,295,446 B1 * | 10/2012 | Apple ................. H04M 15/08 379/88.01 |
| 8,370,262 B2 * | 2/2013 | Blessing ............... G06F 21/32 235/379 |
| 8,509,736 B2 | 8/2013 | Hodge |
| 8,515,031 B2 | 8/2013 | Hodge et al. |
| 8,577,003 B2 | 11/2013 | Rae |
| 8,705,701 B2 | 4/2014 | Bennett, III et al. |
| 8,886,663 B2 | 11/2014 | Gainsboro et al. |
| 8,929,525 B1 | 1/2015 | Edwards |
| 8,948,350 B2 | 2/2015 | Hodge |
| 9,014,355 B2 | 4/2015 | Heaton et al. |
| 9,143,609 B2 | 9/2015 | Hodge |
| 9,143,610 B2 | 9/2015 | Hodge |
| 9,282,188 B2 | 3/2016 | Hodge et al. |
| 9,357,061 B2 | 5/2016 | Rokosky et al. |
| 9,521,250 B2 | 12/2016 | Hodge |
| 9,560,194 B2 | 1/2017 | Hodge |
| 2001/0034220 A1 | 10/2001 | Berstis |
| 2001/0036821 A1 | 11/2001 | Gainsboro |
| 2001/0044295 A1 | 11/2001 | Saito et al. |
| 2001/0056349 A1 | 12/2001 | St. John |
| 2002/0021001 A1 * | 2/2002 | Stratford ................ G06K 7/14 283/74 |
| 2002/0021791 A1 | 2/2002 | Heilmann |
| 2002/0025028 A1 | 2/2002 | Manto |
| 2002/0042879 A1 | 4/2002 | Gould et al. |
| 2002/0046055 A1 | 4/2002 | Martino et al. |
| 2002/0049817 A1 | 4/2002 | Drory et al. |
| 2002/0140542 A1 | 10/2002 | Prokoski et al. |
| 2002/0152390 A1 | 10/2002 | Furuyama et al. |
| 2002/0159571 A1 | 10/2002 | Stock |
| 2002/0177433 A1 | 11/2002 | Bravo et al. |
| 2002/0188575 A1 | 12/2002 | Freeny |
| 2003/0046083 A1 | 3/2003 | Devinney, Jr. et al. |
| 2003/0086546 A1 | 5/2003 | Falcone et al. |
| 2003/0125944 A1 | 7/2003 | Wohlsen et al. |
| 2003/0126470 A1 | 7/2003 | Crites et al. |
| 2003/0138085 A1 | 7/2003 | Forman et al. |
| 2003/0163738 A1 | 8/2003 | Couillard |
| 2003/0215069 A1 | 11/2003 | Hitzeman |
| 2003/0229492 A1 | 12/2003 | Nolan |
| 2004/0010408 A1 | 1/2004 | Mani |
| 2004/0015355 A1 * | 1/2004 | Trinkel ................. H04M 3/38 704/250 |
| 2004/0022382 A1 * | 2/2004 | Sweeney ............ H04M 3/4931 379/218.01 |
| 2004/0028193 A1 | 2/2004 | Kim |
| 2004/0029564 A1 | 2/2004 | Hodge |
| 2004/0081296 A1 | 4/2004 | Brown et al. |
| 2004/0114739 A1 | 6/2004 | Hausmann et al. |
| 2004/0131160 A1 * | 7/2004 | Mardirossian ...... H04L 63/0861 379/38 |
| 2004/0213388 A1 | 10/2004 | Mow |
| 2004/0249650 A1 | 12/2004 | Freedman et al. |
| 2004/0252447 A1 | 12/2004 | Hesse et al. |
| 2005/0063522 A1 * | 3/2005 | Kim ..................... H04M 1/271 379/88.02 |
| 2005/0094794 A1 | 5/2005 | Creamer et al. |
| 2005/0102371 A1 | 5/2005 | Aksu |
| 2005/0125226 A1 | 6/2005 | Magee |
| 2005/0175159 A1 * | 8/2005 | Cooper ............... G10L 15/1815 379/88.03 |
| 2005/0238154 A1 | 10/2005 | Heaton et al. |
| 2005/0246291 A1 * | 11/2005 | Delgrosso .......... G06Q 20/3674 705/67 |
| 2005/0271251 A1 * | 12/2005 | Russell .............. G06K 9/00288 382/103 |
| 2005/0273333 A1 | 12/2005 | Morin |
| 2006/0198504 A1 | 9/2006 | Shemisa et al. |
| 2006/0285650 A1 | 12/2006 | Hodge |
| 2006/0285665 A1 | 12/2006 | Wasserblat et al. |
| 2007/0041545 A1 | 2/2007 | Gainsboro |
| 2007/0047734 A1 | 3/2007 | Frost |
| 2007/0071206 A1 | 3/2007 | Gainsboro et al. |
| 2008/0046241 A1 | 2/2008 | Osburn et al. |
| 2008/0195387 A1 | 8/2008 | Zigel et al. |
| 2009/0083841 A1 * | 3/2009 | Gierach .............. H04L 9/3231 726/7 |
| 2010/0151820 A1 | 6/2010 | Mulherin et al. |
| 2011/0055256 A1 | 3/2011 | Phillips et al. |
| 2011/0206038 A1 | 8/2011 | Hodge |
| 2013/0308499 A1 | 11/2013 | Hodge |
| 2013/0329867 A1 | 12/2013 | Hodge |
| 2014/0317100 A1 * | 10/2014 | Harding ............ G06F 17/30533 707/723 |
| 2015/0156315 A1 | 6/2015 | Hodge |
| 2015/0288810 A1 | 10/2015 | Hodge |
| 2016/0014270 A1 | 1/2016 | Hodge |
| 2016/0021242 A1 | 1/2016 | Hodge |
| 2016/0021243 A1 | 1/2016 | Hodge |
| 2016/0255189 A1 | 9/2016 | Hodge |
| 2017/0006155 A1 | 1/2017 | Hodge |
| 2017/0013120 A1 | 1/2017 | Hodge |
| 2017/0048384 A1 | 2/2017 | Hodge |

FOREIGN PATENT DOCUMENTS

| | | |
|---|---|---|
| EP | 1191771 A2 | 3/2002 |
| EP | 1280137 B1 | 12/2004 |
| GB | 2 148 59 A | 5/1985 |
| WO | WO 97/46964 | 12/1997 |
| WO | WO 0074355 A1 | 12/2000 |

OTHER PUBLICATIONS

"Bellcore Notes on the Networks," Bellcore, Special Report SR-2275, Issue 3, Dec. 1997.
"Cisco IAD2400 Series Business-Class Integrated Access Device", Cisco Systems Datasheet, 2003.
"Cisco IAD2420 Series Integrated Access Devices Software Configuration Guide—Initial Configuration," Cisco Systems, accessed Sep. 23, 2014, accessible at http://www.cisco.com/en/US/docs/rout-

(56) References Cited

OTHER PUBLICATIONS ers/access/2400/2420/software/configuration/guide/init_cf.html.
"Hong Kong: Prison Conditions in 1997," Human Rights Watch, Mar. 1, 1997, C905, available at http://www.refworld.org/docid/3ae6a7d014.html, accessed May 29, 2014.
"Open Architecture—Windows NT," Audiolog Intelligent Recording Solutions, Mercom Systems, Inc., 1998.
"Service-Observing Arrangements Using Key Equipment for Telephone Company Business Offices, Description and Use," Pac. Tel. & Tel. Co., Bell System Practices, Station Operations Manual, Section C71.090, Issue A, 1-1-57-N (1957).
"SIP and IPLinkTM in the Next Generation Network: An Overview" Intel, 2001.
"The Pay-Tel Phone," PayTel Communications Equipment and Products, Dec. 14, 2003.
"Voice Over Packet in Next Generation Networks: An Architectural Framework," Bellcore, Special Report SR-4717, Issue 1, Jan. 1999.
"Criminal Calls: A Review of the Bureau of Prisons' Management of Inmate Telephone Priveliges" U.S. Department of Justice, Office of the Inspector General, Aug. 1999.
Beek et al., "An Assessment of the Technology of Automatic Speech Recognition for Military Applications," IEEE Trans. Acoustics, Speech, and Signal Processing, vol. ASSP-25, No. 4, pp. 310-322 (1977)..
BubbieLINK® Software Architecture (Science Dynamics 2003).
Bur Goode, Voice Over Internet Protocal (VoIP), Proceedings of the IEEE, vol. 90, No. 9, 1495-1517 (Sep. 2002).
Clifford J. Weinstein, MIT, The Experimental Integrated Switched Network—A System-Level Network Test Facility (IEEE 1983).
Commander Call Control System, Rev. 1.04 (Science Dynamics 2002).
Complaint for Patent Infringement, filed Aug. 1, 2013, *Securus Technologies, Inc.* v. *Global Tel*Link Corporation*, Case No. 3:13-cv-03009-K (N.D. Tex.).
Definition of "logic", IEEE 100: The Authoritative Dictionary of IEEE Standard Terms, Seventh Edition, Standards Information Network, IEEE Press (2000).
Definitions of "Local Area Network (LAN)" and "Wide Area Network (WAN)," Microsoft Computer Dictionary (Microsoft Press 2002), pp. 304 and 561.
English-language Abstract for European Patent Publication No. 0989720 A1; 2 pages.
English-language Abstract for European Patent Publication No. 1191771 A2; 2 pages.
File History of U.S. Pat. No. 7,899,167, U.S. Appl. No. 10/642,532, filed Aug. 15, 2003.
File History of U.S. Pat. No. 8,577,003, U.S. Appl. No. 13/009,483, filed Jan. 19, 2011.
Final Office Action for U.S. Appl. No. 12/861,322, mailed Apr. 24, 2013; 4 pages.
Fox, B., "The First Amendment Rights of Prisoners," 63 J. Crim. L. Criminology & Police Sci. 162 (1972).
Jeff Hewett and Lee Dryburgh, Signaling System No. 7 (SS7/C7); Protocol, Architecture, and Services (Networking Technology) at 85 (Cisco Press, Jun. 2005).
Joint Claim Construction and Prehearing Statement, Exhibit B: Securus' Intrinsic and Extrinsic Evidence Charts, *Global Tel*Link Corporation* v. *Securus Technologies, Inc.*, No. 3:14-cv-00829-K (N.D. Tex.), Sep. 26, 2014.
Microsoft Computer Dictionary, Fifth Edition, Microsoft Computer Press: Redmond, WA, 2002.
Non-Final Office Action for U.S. Appl. No. 11/045,589, mailed Jul. 10, 2008; 5 pages.
Non-Final Office Action for U.S. Appl. No. 11/045,589, mailed Jun. 2, 2009; 4 pages.
Non-Final Office Action for U.S. Appl. No. 12/861,322, mailed Jul. 3, 2012; 6 pages.
Notice of Allowance for U.S. Appl. No. 11/045,589, mailed Apr. 13, 2010; 4 pages.

Osifchin, N., "A Telecommunications Buildings/Power Infrastructure in a New Era of Public Networking," IEEE 2000.
PacketCableTM 1.0 Architecture Framework Technical Report, PKT-TR-ARCH-V0 1-001201 (Cable Television Laboratories, Inc. 1999).
Pages from http://www.corp.att.com/history, archived by web.archive.org on Nov. 4, 2013.
Prosecution History of U.S. Appl. No. 11/005,816, filed Dec. 7, 2004.
Prosecution History of U.S. Appl. No. 11/045,589, filed Jan. 28, 2004.
Prosecution History of U.S. Appl. No. 11/182,625, filed Jul. 15, 2005.
Prosecution History of U.S. Appl. No. 11/479,990, filed Jun. 30, 2006.
Rey, R.F., ed., "Engineering and Operations in the Bell System," 2nd Edition, AT&T Bell Laboratories: Murray Hill, NJ, 1983.
Science Dynamics, Inmate Telephone Control Systems, http://scidyn.com/fraudprev_main.htm (archived by web.archive.org on Jan. 12, 2001).
Science Dynamics, SciDyn BubbleLINK, http://www.scidyn.com/products/bubble.html (archived by web.archive.org on Jun. 18, 2006).
Science Dynamics, SciDyn Call Control Solutions: Commander II, http://www.scidyn.com/products/commander2.html (archived by web.archive.org on Jun. 18, 2006).
Science Dynamics, SciDyn IP Gateways, http://scidyn.com/products/ipgateways.html (archived by web.archive.org on Aug. 15, 2001).
Science Dynamics, Science Dynamics—IP Telephony, http://scidyn.com/iptelephony_maim.html (archived by web.archive.org on Oct. 12, 2000).
Simmons, R., "Why 2007 is Not Like 1984: A Broader Perspective on Technology's Effect on Privacy and Fourth Amendment Jurisprudence," 97 J. Crim. L. & Criminology 531(2006-2007).
Smith, Megan J., "Corrections Turns Over a New LEAF: Correctional Agencies Receive Assistance From the Law Enforcement Analysis Facility," Corrections Today, Oct. 1, 2001.
Specification of U.S. Appl. No. 10/720,848, "Information Management and Movement System and Method," to Viola, et al., filed Nov. 24, 2003.
Sundstrom, K., "Voice over IP: An Engineering Analysis," Master's Thesis, Department of Electrical and Computer Engineering, University of Manitoba, Sep. 1999.
U.S. Appl. No. 10/135,878, "Information Management and Movement System and Method," to Viola, et al., filed Apr. 29, 2002.
U.S. Prov. Appl. No. 60/607,447, "IP-based telephony system and method," to Apple, et al., filed Sep. 3, 2004.
Walden, R., "Performance Trends for Analog-to-Digital Converters," IEEE Communications Magazine, Feb. 1999.
"Cool Edit Pro, Version 1.2 User Guide," Syntrillium Software Corporation, 1998.
"Global Call API for Linux and Windows Operating Systems," Intel Dialogic Library Reference, Dec. 2005. (3 parts).
"The NIST Year 2002 Speaker Recognition Evaluation Plan," NIST, Feb. 27, 2002, accessible at http://www.itl.nist.gov/iad/mig/tests/spk/2002/2002-spkrecevalplan-v60.pdf.
Auckenthaler, et al., "Speaker-Centric Score Normalization and Time Pattern Analysis for Continuous Speaker Verification," International Conference on Acoustics, Speech, and Signal Processing (ICASSP), vol. 2, Jun. 2000, pp. 1065-1068.
Audacity Team, "About Audacity," World Wide Web, 2014, accessible at http://wiki.audacity.team.org/wiki/About_Audacity.
Beigi, et al., "A Hierarchical Approach to Large-Scale Speaker Recognition," EuroSpeech 1999, Sep. 1999, vol. 5; pp. 2203-2206.
Beigi, et al., "IBM Model-Based and Frame-By-Frame Speaker-Recognition," Recognition and its Commercial and Forensic Applications, Apr. 1998; pp. 1-4.
Beigi, H., "Challenges of Large-Scale Speaker Recognition," 3rd European Cooperation in the Field of Scientific and Technical Research Conference Nov. 4, 2005.
Boersma, et al., "Praat: Doing Phonetics by computer," World Wide Web, 2015, accessible at http://www.fon.hum.uva.nl/praat.

(56) References Cited

OTHER PUBLICATIONS

Bolton, et al., "Statistical Fraud Detection: A Review," Statistical Science, vol. 17, No. 3 (2002), pp. 235-255.
Carey, et al., "User Validation for Mobile Telephones," International Conference on Acoustics, Speech, and Signal Processing (ICASSP), vol. 2, Jun. 2000, pp. 1093-1096.
Chaudhari, et al., "Transformation enhanced multi-grained modeling for text-independent speaker recognition," International Conference on Spoken Language Processing, 2000, pp. 298-301.
Clavel, et al., "Events Detection for an Audio-Based Surveillance System," IEEE International Conference on Multimedia and Expo (ICME2005), Jul. 6-8, 2005, pp. 1306-1309.
Defendant's Opening Claim Construction Brief, *Global Tel*Link Corporation* v. *Securus Technologies, Inc.*, Case No. 3:14-cv-0829-K (N.D. Tex.), filed Nov. 19, 2014.
Defendant's Responsive Claim Construction Brief, *Global Tel*Link Corporationv. Securus Technologies, Inc.*, Case No. 3:14-cv-0829-K (N.D. Tex.), filed Nov. 19, 2014.
Dunn, et al., "Approaches to speaker detection and tracking in conversational speech," Digital Signal Processing, vol. 10, 2000; pp. 92-112.
File History of U.S. Pat. No. 8,886,663, U.S. Appl. No. 12/284,450, filed Sep. 20, 2008. (2 parts).
Final Office Action for U.S. Appl. No. 13/949,980, mailed Nov. 20, 2014; 7 pages.
Furui, et al., "Experimental studies in a new automatic speaker verification system using telephone speech," Acoustics, Speech, and Signal Processing, IEEE International Conference on ICASSP '80, vol. 5, Apr. 1980, pp. 1060-1062.
Furui, et al., "50 Years of Progress in Speech and Speaker Recognition Research," ECTI Transactions on Computer and Information Technology, vol. 1, No. 2, Nov. 2005, pp. 64-74.
Hansen, et al., "Speaker recognition using phoneme-specific gmms," The Speaker and Language Recognition Workshop, May-Jun. 2004.
Isobe, et al., "A new cohort normalization using local acoustic information for speaker verification," Proceedings of the IEEE International Conference on Acoustics, Speech, and Signal Processing, vol. 2, Mar. 1999; pp. 841-844.
Juang, et al., "Automatic Speech Recognition—A Brief History of the Technology Development," Oct. 8, 2014.
Kinnunen, et al., "Real-Time Speaker Identification and Verification" IEEE Transactions on Audio, Speech, and Language Processing, vol. 14, No. 1, Jan. 2006, pp. 277-288.
Maes, et al., "Conversational speech biometrics," E-Commerce Agents, Marketplace Solutions, Security Issues, and Supply and Demand, Springer-Verlag, London, UK, 2001, pp. 166-179.
Maes, et al., "Open SESAME! Speech, Password or Key to Secure Your Door?," Asian Conference on Computer Vision, Jan. 1998; pp. 1-3.
Matsui, et al "Concatenated Phoneme Models for Text-Variable Speaker Recognition," International Conference on Acoustics, Speech, and Signal Processing (ISACCP), vol. 2, Apr. 1993; pp. 391-394.
Non-Final Office Action for U.S. Appl. No. 13/949,980, mailed Jul. 15, 2014; 6 pages.
Notice of Allowace for U.S. Appl. No. 13/949,980, mailed May 7, 2015; 5 pages.
Original Specification as-filed Aug. 26, 2005, in U.S. Appl. No. 11/212,495 to Frost.
Original Specification as-filed Jul. 22, 2005, in U.S. Appl. No. 11/187,423 to Shaffer.
Pelecanos, J. "Conversational biometrics," in Biometric Consortium Meeting, Baltimore, MD, Sep. 2006, accessible at http://www.biometrics.org/bc2006/presentations/Thu_Sep_21/Session_I/Pelecanos_Conversational_Biometrics.pdf.
Pollack, et al., "On the Identification of Speakers by Voice," The Journal of the Acoustical Society of America, vol. 26, No. 3, May 1954.
Prosecution History of U.S. Appl. No. 11/480,258, filed Jun. 30, 2006.
Prosecution History of U.S. Appl. No. 12/002,507, filed Dec. 17, 2007.
Reynolds, D., "Automatic Speaker Recognition Using Gaussian Mixture Speaker Models," The Lincoln Laboratory Journal, vol. 8, No. 2, 1995; pp. 173-192.
Rosenberg, et al., "The Use of Cohort Normalized Scores for Speaker Verification," Speech Research Department, AT&T Bell Laboratories, 2nd International Conference on Spoken Language Processing, Banff, Alberta, Canada, Oct. 12-16, 1992.
Ross, et al., "Multimodal Biometrics: An Overview," Proc. of 12th European Signal Processing Conference (EUSIPCO), Vienna, Austria, Sep. 2004, pp. 1221-1224.
Shearme, et al., "An Experiment Concerning the Recognition of Voices," Language and Speech, vol. 2, No. 3, Jul./Sep. 1959.
Viswanathan, et al., "Multimedia Document Retrieval using Speech and Speaker Recognition," International Journal on Document Analysis and Recognition, Jun. 2000, vol. 2; pp. 1-24.
Newton, H., Newton's Telecom Dictionary (18th ed. 2002); p. 655.
"The AutoEDMS Document Management and Workflow System: An Overview of Key Features, Functions and Capabilities," ACS Software, May 2003.
"PacketCable™ Audio/Video Codecs Specification," Cable Television Laboratories, Inc., Ser. No. PKT-SP-CODEC-I05-040113 (2004).
Kozamernik, F., "Media Streaming over the Internet—an overview of delivery technologies," EBU Technical Review (Oct. 2002).
Fleischman, E., "Advanced Streaming Format (ASF) Specification," Microsoft Corporation (Jan. 9, 1998).
Claim Construction Order, *Single Touch Interactive, Inc.* v. *Zoove Corporation*, Case No. 4:12-cv-00831-YGR (N.D. Cal.), filed Jul. 17, 2013.
USPTO Class Definition, Class 379 Telephonic Communications, available at http://www.uspto.gov/web/patents/classification/uspc379/defs379.htm.
Excerpts from the Prosecution of U.S. Appl. No. 10/135,878, filed Apr. 29, 2002.
Definition of "telephony", McGraw-Hill Dictionary of Scientific and Technical Terms, 6th Edition (McGraw-Hill, 2003).
Response to Office Action, filed Jan. 6, 2009, in Prosecution History of U.S. Appl. No. 10/642,532, filed Aug. 15, 2003.
Definitions of "logic", IEEE 100: The Authoritative Dictionary of IEEE Standard Terms, Seventh Edition, Standards Information Network, IEEE Press (2000).
Definitions of "suspicion" and "suspect", American Heritage Dictionary, 4th Edition, New York: Houghton Mifflin, 2006; pp. 1743-1744.
Investigative Analysis Software webpage titled "i2 TextChart, Text Visualized", published by The Visual Space, available at www.i2.co.uk/products/i2TextChart/, accessed Jun. 13, 2005; 2 pages.
Excerpts from the Prosecution History of U.S. Pat. No. 7,899,167, U.S. Appl. No. 10/642,532, filed Aug. 15, 2003.
File History of U.S. Pat. No. 9,143,609, U.S. Appl. No. 13/949,980, filed Jul. 24, 2013.
Parties' Proposed Claim Constructions in *Global Tel*Link Corporation* v. *Securus Technologies, Inc.*, No. 3:14-cv-00829-K (N.D. Tex.), filed Sep. 26, 2014; 17 pages.
CTI Edge Automated Operator System Brochures, Jan.-Feb. 1988.
Definition of "constantly", The American Heritage College Dictionary, 4th Ed. (2002); p. 306.
Final Office Action for U.S. Appl. No. 10/215,367, dated Feb. 20, 2007; 8 pages.
Final Office Action for U.S. Appl. No. 10/215,367, dated Sep. 7, 2005; 10 pages.
Final Office Action for U.S. Appl. No. 10/893,575, dated Feb. 22, 2007; 13 pages.
Final Office Action for U.S. Appl. No. 11/371,641, dated Oct. 8, 2009; 10 pages.
Final Office Action for U.S. Appl. No. 12/002,507, dated Mar. 9, 2010; 10 pages.
Final Office Action for U.S. Appl. No. 12/218,145, dated Apr. 4, 2014; 21 pages.

(56) References Cited

OTHER PUBLICATIONS

Final Office Action for U.S. Appl. No. 12/218,145, dated Dec. 19, 2012; 24 pages.
Final Office Action for U.S. Appl. No. 13/966,011, dated Feb. 13, 2015; 5 pages.
Final Office Action for U.S. Appl. No. 14/743,041, dated Jul. 19, 2016; 6 pages.
Non-Final Office Action for U.S Appl. No. 14/743,041, dated Feb. 17, 2016; 6 pages.
Non-Final Office Action for U.S. Appl. No. 10/215,367, dated Dec. 16, 2004; 8 pages.
Non-Final Office Action for U.S. Appl. No. 10/215,367, dated May 23, 2006; 7 pages.
Non-Final Office Action for U.S. Appl. No, 10/893,575, dated Jul. 21, 2006; 15 pages.
Non-Final Office Action for U.S. Appl. No. 11/371;641, dated Mar. 5, 2010; 13 pages.
Non-Final Office Action for U.S. Appl. No. 11/371,641, dated May 13, 2009; 9 pages.
Non-Final Office Action for U.S. Appl. No. 12/002,507, dated Sep. 24, 2009; 8 pages.
Non-Final Office Action for U.S. Appl. No. 12/218,145, dated Jun. 19, 2013; 26 pages.
Non-Final Office Action for U.S. Appl. No. 12/218,145, dated Nov. 23, 2011; 19 pages.
Non-Final Office Action for U.S. Appl. No. 12/951,790, dated Nov. 6, 2012; 4 pages.
Non-Final Office Action for U.S. Appl. No. 13/996,011, dated Oct. 23, 2014; 8 pages.
Non-Final Office Action for U.S. Appl. No. 14/613,153, dated May 31, 2016; 18 pages.
Non-Final Office Action for U.S. Appl. No. 14/613,153, dated Nov. 18, 2015; 20 pages.
Non-Final Office Action for U.S. Appl. No. 14/613,153, dated Oct. 2, 2015; 17 pages.
Notice of Allowability for U.S. Appl. No. 11/371,641, dated Sep. 21, 2010; 3 pages.
Notice of Allowability for U.S. Appl. No. 13/966,011, dated May 20, 2015; 4 pages.
Notice of Allowance for U.S. Appl. No. 10/215,367, dated Sep 18, 2007; 3 pages.
Notice of Allowance for U.S. Appl. No. 10/893,575, dated Mar. 11, 2008; 7 pages.
Notice of Allowance for U.S. Appl. No. 11/371,641, dated Jul. 21, 2010; 6 pages.
Notice of Allowance for U.S. Appl. No. 12/002,507, dated Aug. 5, 2010; 6 pages.
Notice of Allowance for U.S. Appl. No. 12/218,145, dated Sep. 11, 2014; 10 pages.
Notice of Allowance for U.S. Appl. No. 12/951,790, dated Apr. 16, 2013; 12 pages.
Notice of Allowance for U.S. Appl. No. 13/966,011, dated Jul. 30, 2015; 7 pages.
Notice of Allowance for U.S. Appl. No. 13/966,011, dated Mar. 20, 2015; 7 pages.
Supplemental Notice of Allowability for U.S. Appl. No. 12/218,145, dated Dec. 22, 2014; 2 pages.
Supplemental Notice of Allowability for U.S. Appl. No. 12/951,790, dated Jul. 22, 2013; 8 pages.
Supplemental Notice of Allowability for U.S. Appl. No. 15/951,790, dated May 3, 2013; 8 pages.
U.S. Appl. No. 12/284,450, "Multi-Party Conversation Analyzer and Logger,"to Gainsboro et al., filed Sep. 20, 2008; 47 pages.
U.S. Appl. No. 60/607,447, "IP-based telephony system and method," to Apple, et al., filed Sep. 3, 2004.
Value Added Communications, System 20 Dealer Information Package, Apr. 1991.
File History of U.S. Pat. No. 7,333,798, U.S. Appl. No. 10/215,267, filed Aug. 8, 2002.
Birnbaum et al., "A Voice Password System for Access Security," AT&T Technical Journal, vol. 65, No. 5, Sep./Oct. 1986; pp. 68-74.
File History of U.S. Pat. No. 7,403,766, U.S. Appl. No. 10/893,575, filed Jul. 16, 2004.
Nuance 7.0 Technical Data Sheet, available at www.nuance.com; 2 pages.
Nuance 7,0: Powerful Speech Recognition for Transactions over the Telephone, Nuance Comimmications, 2000; 2 pages.
Nuance 7.0: Powerful Speech Recognition for Transactions over the Telephone, Nuance Communications, Jun. 19, 2000-Mar. 14, 2002, http://www.nuance.com/index.htma?SCREEN=nuance7; 2 pages.
U.S. Appl. No. 15/154,645, "Telecommunication Call Management and Monitoring System with Voiceprint Verification,"to Hodge, filed May 13, 2016.
Non-Final Office Action for U.S. Appl. No. 14/865,779, dated Aug. 4, 2016; 6 pages.
Non-Final Office Action for U.S. Appl. No. 14/865,679, dated Aug. 1, 2016; 8 pages.
Notice of Allowability for U.S. Appl. No. 10/215,367, dated Sep. 18, 2007; 3 pages.
Notice of Allowance for U.S. Appl. No. 14/743,041, dated Oct. 12, 2016; 7 pages.
Notice of Allowance for U.S. Appl. No. 14/865,779,. dated Dec. 15, 2016; 7 pages.
Non-Final Office Action for U.S. Appl. No. 15/266,551, dated Dec. 16, 2016; 8 pages.
Non-Final Office Action for U.S. Appl. No. 15/268,142, dated Jan. 13, 2017; 21 pages.
Non-Final Office Action for U.S. Appl. No. 15/337,804, dated Jan. 3, 2017; 27 pages.
Non-Final Office Action for U.S. Appl. No. 15/287,458, dated Dec. 29, 2016; 20 pages.
Final Office Action for U.S. Appl. No. 14/613,153, dated Jan. 25, 2017; 35 pages.
Non-Final Office Action for U.S. Appl. No. 15/154,645, dated Feb. 1, 2017; 5 pages.
Non-Final Office Action for U.S. Appl. No. 15/346,543, dated Feb. 23, 2017; 24 pages.
Notice of Allowance for U.S. Appl. No. 14/865,779, dated Feb. 15, 2017; 4 pages.
Non-Final Office Action for U.S. Appl. No. 14/865,658, dated Mar. 7, 2017; 31 pages.

* cited by examiner

DIGITAL TELECOMMUNICATIONS CALL MANAGEMENT AND MONITORING SYSTEM

CROSS-REFERENCE TO RELATED APPLICATION

This is a continuation application of U.S. patent application Ser. No. 13/949,980, filed Jul. 24, 2013, which is a continuation application of U.S. patent application Ser. No. 12/861,322, filed Aug. 23, 2010, which is a continuation application of U.S. application Ser. No. 11/045,589, filed Jan. 28, 2005, now U.S. Pat. No. 7,783,021, issued Aug. 24, 2010, all of which are incorporated herein by reference in their entirety.

BACKGROUND OF THE INVENTION

Field of the Invention

The present invention relates generally to the field of telephone communication systems in penal institutions or similar facilities. In particular, the present-invention relates to a centralized, fully self-contained, digital, computer-based telecommunication system with the capacity to allow an institution to control, record, monitor, and report usage and access to a telephone network.

Background Art

Generally, the need to monitor, control, record and provide detailed records of the usage of a telephone system in a controlled institutional environment is well recognized. It is common to utilize a controlled telephone system capable of monitoring outgoing telephone connections in many types of institutional environments, including penal institutions, military institutions, hospitals, schools, businesses, specific types of government institutions, etc. The reasons for monitoring and controlling institutional telephone systems are evident. To prevent such institutions from incurring unaccountable telephone costs, the institutions must either restrict access to outbound telephone lines or employ a telephone monitoring system to charge the responsible party for making the outbound communication. Otherwise, unaccountable telephone costs would severely hinder the availability of the telephone systems in institutions.

Therefore, it is imperative for many institutions to utilize a communication system that provides an accurate identification means for administrators to determine the individual responsible for each outbound telephone call. A communication system must also provide a monitoring means for maintaining a useful record of the communication. Additionally, the system should include a means for restricting access or a means for providing options to particular users. Considering the number of users in a large institution, different payment methods available, and the excessive call volume at many institutions, it is evident that an effective telephone management system is essential.

Providing telephone systems in specific types of highly restricted institutions, such as penal institutions, results in the consideration of numerous additional complicating factors. Generally, the government heavily regulates outbound communication means in penal institutions. Therefore, communication systems implemented in penal institutions or similar facilities must meet greater security requirements often mandated by regulatory bodies affiliated with the county, state, or federal institution. Thus, the communication system used in a regulated institution must employ unique functions often unnecessary in other types of institutions.

In its most general form, a penal institution's telephone system utilizes a call processor to approve and place a call, surveillance equipment or monitoring equipment, and a recording device for evidencing the conversation. Generally, these simple systems are not equipped to restrict an inmate from calling an individual. However, it is preferable for the call system devices now, employed in such institutions to have the capability to thwart an inmate from calling certain specific individuals or types of individuals. Systems currently exist capable of controlling calls. Without the necessary constraints on an inmate's use of the telephone system, inmates have often harassed outside parties or individuals. For example, it is generally preferred that an inmate be prevented from placing a telephone call to the prosecutor who prosecuted the inmate's case or another attorney responsible for the sentencing of the inmate. In another example, it may be preferred that an inmate be prevented from contacting the victim of the inmate's crime or witnesses from the inmate's case. It has also been documented that inmates have used previous penal institution call systems to perpetrate additional criminal activities such as fraudulent schemes or specific criminal conspiracies. Specifically, inmates have been known to arrange credit card fraud attempts, the smuggling of contraband into the facility, and have even been known to arrange escape attempts over the penal institution's telephone system. Therefore, it is critical in an efficient penal institution to carefully monitor all outgoing telephone calls making a regulated penal institution telephone system a necessity.

Another concern in implementing an efficient institution telephone system is cost control. In order for a system to be cost effective the system must critically monitor and record the activities of each individual user to properly charge each individual caller for his or her outgoing calls. Typically, telephone communication systems in penal institutions provide an inmate with a telephone account upon arrival. Each individual receives an account number. There are several options for an inmate to select with respect to payment on the account. For example, an inmate may place prior personal earnings into the account. The cost of each call is then deducted from the total amount in the inmate's account until no balance remains. The inmate may also choose to utilize collect call means. In addition, an inmate may be assigned a commissary account, where funds are added to the account based on work performed by the inmate. As the funds increase, the inmate may apply these funds to the cost of placing telephone calls. The inmate debit account may be located onsite, at a central office facility, or at a third-party site.

The inmate's family may alternatively control the inmate debit account. For example, the inmate's family may control the inmate's access to the debit account either remotely (e.g., by using the Internet, accessing a toll-free/pay to dial telephone number, using a mail form, etc.) or by visiting the prison facility. The inmate's family may add funds to the debit account and thereby control the call volume allowed to the inmate.

Another requirement of a secure telephone management system in a penal institution is the accurate identification of the telephone call participants. Generally, it is common in a penal institution to assign each inmate a personal identification number ("PIN"). When an inmate attempts to place a telephone call, the inmate must supply a valid PIN to gain access to the telephone system. However, a primary problem with this identification method is the ease of obtaining another inmate's PIN. For example, individuals who commonly forget their PIN may write it down, increasing the possibility that an unauthorized individual will view the PIN and use it.

In addition, if a PIN number is compromised and utilized by an unauthorized inmate, the unauthorized inmate may then be able to call certain individuals who are restricted to that, inmate, since the unauthorized inmate is no longer using the proper PIN associated with that inmate. In known systems, the PIN identification method is incapable of verifying that the individual who supplies the PIN is the actual specified inmate. Some systems have attempted to improve security by requiring the use of a debit card in conjunction with a PIN. The use of the debit card will only allow access to an inmate's account if the correct associated PIN is supplied. This method, however, provides only minimal additional protection because a debit card and its associated PIN can often easily be taken from another inmate, or given to another inmate. For example, one inmate may threaten another inmate in order to obtain such information. Alternatively, one inmate may provide certain services in exchange for the use of another inmate's telephone privileges. The possibility that two inmates will exchange accounts also exists, thereby allowing them to contact people that would normally be restricted to them.

Further attempts to obviate security concerns include requiring personal information in addition to a PIN to be supplied by the inmate/user, for example, a user might be prompted to supply a PIN as well as certain information that may only be known to the user. A common example is a request, by the call system to provide their mother's maiden name. This provides an additional security measure, but again is minimally secure because such information can easily be obtained in a correctional facility. It would therefore be desirable to develop a telephone management system that incorporates an improved method of identification or verification.

Another required feature of a telephone management system for a penal institution or similar facility is a means for restricting calls placed by a user (e.g., an inmate). It is well documented that inmates often try to harass individuals related to their arrest or confinement, such as judges, prosecutors or witnesses, etc., through telephonic communications. Penal institutions have attempted to prevent this by restricting the telephone numbers each inmate is able to access. For example, a system may utilize a PIN or other identification means to access a list of telephone numbers that the inmate may not call, or alternatively, the system may access a list of numbers that the inmate is authorized to connect to (i.e., the inmate can only call the numbers appearing on the list). Telephone numbers placed on the restricted list can include any individual related to the conviction (e.g., the arresting police officer, the prosecuting attorney, etc.), while telephone numbers placed on the permitted list may be, for example, close family relatives. The system may also limit the amount of time each inmate/user is permitted to conduct each outbound telephone call through the system. Furthermore, restrictions may be regularly updated. For example, if an inmate misbehaves, the inmate's telephone privileges may be further limited or revoked completely.

Penal institutions are also concerned with monitoring the activities and communications of inmates. Monitoring telephone activities is necessary to restrict connections to illegal activities outside of the institution.

Three existing types of call monitoring techniques are known in the art. The first technique is live monitoring. Live monitoring requires an operator or other individual to listen to each telephone call-and-alert the proper authorities if necessary.

The second type of monitoring involves recording the telephone conversation via a common recording device. A common example of this is a recording device such as a magnetic tape drive or a computer hard drive. This type of monitoring may be continuous or intermittent depending on the degree of security required for each inmate.

The third type of monitoring is known as passive monitoring. Passive monitoring may be activated when certain keywords are spoken. In addition, passive monitoring may be activated if the telephone call at the termination end is transferred to a third party via certain known detection means such as silence detection, hook-flash detection, etc.

Penal institutions currently record most inmate telephone calls, with the exception of lawyer-inmate communications, which are generally prohibited by law. Typically in the art, monitoring may occur using any combination of the three methods (e.g., live monitoring, electronic recording monitoring, or passive monitoring). However, it would be desirable for a telephone management system to embody a means for determining which level of telephone monitoring should be employed for each telephone call. For example, it can be advantageous to flag certain individuals in an inmate's profile as highly suspicious. If the inmate initiates communication with the flagged individual, the system will alert a live operator to monitor the system. In such a system it is essential that the system correctly identify the called individual to avoid unnecessary expenditure of live operators.

Alternatively, the inmate telephone call system may utilize a remote alert notification system wherein the system contacts an operator when a violation has occurred. The system may contact the operator utilizing telephone means, paging means, computer means, etc. This notification system may be set to call the operator a limited number of times or until the alert has been noted in the inmate telephone call system. The operator may then access information about the alert remotely using the telephone, Internet, or any other such remote access means.

In order to alleviate some of the problems and concerns discussed herein, many penal institutions have implemented certain task-specific advanced systems. Generally, these "advanced" systems known in the art comprise several features.

For example, it is known in current systems to employ permanent call blocking. Specifically, it is known in the art to block an inmate or group of inmates from dialing certain telephone numbers. Most systems also prevent inmates from talking directly to live operators. This prevents inmates from requesting that the operator forward a call or provide additional telephone numbers allowing inmates to harass or locate additional parties. Furthermore, current systems block "1-800", "1-900" and other like telephone numbers including toll-free and pay-to-dial telephone numbers. In addition certain institutions may elect to block country codes, specific area codes, or other third-party numbers.

Current systems known in the art may also utilize a feature commonly referred to as "selective" call-blocking. As discussed, "selective" call blocking maybe employed to thwart inmates from establishing a connection with a selected group of individuals (i.e., with the home telephone of prison guards, wardens, indictment witnesses, trial witnesses, police officers, judges, etc.). It is also foreseeable that the telephone numbers of the family members of these specific individuals may also be blocked.

Some current systems also limit the use of specific long-distance carriers. This feature proves useful in limiting unnecessary costs incurred by employing alternate carriers.

Several current systems utilize features commonly referred to as "hook flash" prevention or "click" and "pop" prevention modes. These systems prevent inmates from extending the current outgoing telephone call and entering a new telephone call with a new number without fully terminating the original telephone call. For example, this prevents an inmate from utilizing common call forwarding features and the like.

In addition, some current institutional telephone systems electronically or manually disable the keypad after a telephone number is dialed and the telephone-call is connected. This feature prevents inmates from interacting with telephone games and lotteries, and in certain older systems, prevents the inmate from achieving an unrestricted dial tone.

Another common feature employed by institutional, systems is three-way call prevention. This feature prevents an inmate from instructing the called party to bridge the telephone call to another telephone number.

Other known systems in the art may exhibit other regulatory features. For example, telephone communication systems generally allow an institution to limit the duration of a telephone call or to limit the cost of the telephone call. These types of features farther allow a facility to customize the telephone call systems thereby preventing unrecoverable expenditures.

Another control used by current institution telephone systems is the use of certain aspects of biometric recognition for the identification of users or inmates, (i.e., the calling party). However, systems known in the art have only used biometrics to a limited extent. It is highly beneficial for communication systems in penal institutions to incorporate biometrics as an additional security device. Biometric recognition is commonly available in a number of fields. For example, biometrics recognition has found a number of security uses, including common usage, in credit card systems and building security systems. Biometric information includes fingerprints, hand geometry, voiceprints, retinal patterns, iris scans, signatures, infrared facial patterns, and all other sources which constitute unique physiological characteristics and which can assist in establishing a person's identity. Various devices exist which can scan one or more biometric characteristics and digitize the information.

One system known in the art discloses an automatic account number validation and billing management system. The system prompts a user for an account number and compares the number inputted to a number stored in a database to determine validity. If the account number is valid and found in the database, the system completes the predetermined telephonic connection, if the number is riot in the database, and therefore invalid, the system will utilize voice prompts to request re-entry of the number or provide further instructions. The system attempts to locally automate and simplify the process of payment for routing calls without live operator assistance, but does not address additional security concerns that may exist in specific facilities, such as in a penal institution. Furthermore, it does not provide for protection measures to confirm that the individual supplying the account number is the individual entitled to the use of the account. In such a hostile environment as a penal institution, an account number may easily be obtainable through coercion or by force. Additionally, the system does not provide any means of monitoring the conversations taking place or restricting which Individuals are accessed by the user.

Another system discloses a call management system enabling prepayment of telephone calls utilizing a debit system. Specifically, a user of the system obtains a special code by depositing a prepayment. The prepayment is stored in a database on the call management system for use in verifying calling party calls. To access the system, a user dials a special number and inputs a user-specific code for verification followed by the number of the party to be called. Next, the code is verified by the system. If verification is successful and sufficient funds are available, the call is connected. The prepayment amount, minus deductions for the running cost of the call, is tabulated as the call progresses. The call-terminates either when the prepaid funds are exhausted in the user's account or when either party disconnects. The invention also includes steps to prevent the same access code from being used at different terminals. However, the system does not teach a means for selecting the call type or a call monitoring means. It also fails to teach an advanced verification means specific to a user.

Yet another system teaches a multilingual prepaid telephone system capable of interfacing with a public switched telephone network ("PSTN"). In the system, each user of the system is assigned a PIN and a credit account. To access the system, a user first dials a number to access the telephone system and chooses a language for all subsequent voice prompts. The user then supplies a PIN which is compared against a list of numbers in a database. If sufficient credit is available for the duration of a telephone call to the destination number, the connection is completed and a timer is set for the available duration of the call. The call terminates either when the allowed amount of time for the call expires or if one party member hangs up the telephone line. If the latter situation occurs, the system computes a new available credit balance for the user's account. The system fails to provide a selection means for the user, such as the ability to choose the type of call to be placed (e.g., collect, debit, international, etc.). It also fails to teach any call monitoring means and would therefore be unacceptable as a communication system for a penal institution.

Still another system discusses an integrated commissary system for receiving and processing orders in an institutional setting. The commissary system is designed for use without access to a PSTN. According to the system, user status and inventory status are stored in an onsite database. To access the database, a user provides identifier information and item selections through selected telephones. The selections are compared against the onsite database using a processor. If the user is authenticated and the requested items are available, the processor generates transaction records, updates user commissary information, and correctly adjusts inventory. The updated information is stored in a file that may be used for record keeping or archival purposes. However, it does not teach a commissary system for use with a PSTN. This system also fails to teach multiple authentication means and would therefore be unacceptable for use in a penal institution.

Still a different system known in the art discloses a software process for real-time call rating and debiting so that a subscriber's account balance is not exceeded. The method disclosed estimates the time when the user's balance will expire by using the total charge per second average. The process then determines the time remaining by dividing the account balance by the average charge per second of all telephone calls, and the time limit for the call is then set accordingly. This method is useful if the rate for long distance calls is not known locally. However, the system does not allow for other types of calls, such as collect calls, to take place. Furthermore, it fails to provide an advanced call monitoring apparatus with an advanced authentication apparatus.

There is also a system that depicts an automated public telephone control for charge or collect call billing. The apparatus embodies a microprocessor system controlling voice prompting, recognition of responses, network signaling, recording of calling details, and verification of account numbers. The disclosed invention provides for an automated telephone billing for public telephone systems. The system offers a plurality of billing methods, such as billing to a credit account number, to the called party (collect calling), or to a third party. An additional aspect of the invention describes the recognition of voice utterances from other signals and called party spoken words (i.e., the system can recognize the word "yes" when spoken by any individual). However, it does not identify or verify the individual speaking. Furthermore, this system does not provide a means to identify the user or verify that the user is not partaking in fraudulent activities. It also fails to teach of a monitoring and call control means.

Yet a different system discloses a system for a detection and a reaction to "hook flash" events occurring during a telephone communication. This system is, primarily concerned with the detection of "hook flash" events caused by the initiation of a three-way conference call. The system monitors the calls for particular sounds in intervals and tests if the sound is constant within other intervals. For example, if a sound is detected in the second interval that did not exist in the first interval further analysis will ensue. The system may then compare the total number of dialed digits with the original number of dialed digits to determine if an additional digit was dialed. The additional digit identified may cause the new sound in the second interval. Additional forms of analysis are also contemplated. If the additional sound cannot be explained through further analysis, the system may terminate the call. However, the system fails to disclose a means for incorporating biometric recognition in an institution telephone call system. Furthermore, it fails to disclose a means for incorporating a WAN-based institution telephone control system.

Yet still another system depicts a collect call system which can automatically route long distance calls without intervention of an outside service or operator. This feature enables private public telephone owners, as opposed to primary telephone companies, to receive revenue for completion of the call. The invention comprises the steps of providing the calling party with voice prompts, receiving voice or dialed signal information about the calling party in response to the voice prompts, locally recording the information about the calling party, providing the called party information about the calling party, and reacting to a variety of provided signals by either the called or calling party. The system only provides a method and apparatus for placing collect calls. In addition, it avoids consideration of providing other possible payment methods. The system disclosed is further limited by its lack of telephone call monitoring ability and calling party identification means, and is therefore unsuitable for use in penal institutions.

A different system discloses a system utilizing biometric verification means for determining if a user is authorized to use a credit or identification card. The invention introduces a method embodying the steps of receiving biometric data from a cardholder, scanning the card to obtain user information, and retrieving authorized card owner information stored in a database. The information obtained from the three sources (i.e., cardholder, card, and database) is analyzed and compared to verify that the cardholder is the authorized card owner. The system describes a number of possible biometric features that may be used such as voiceprints, fingerprints, digital photography, and retinal scans. It is an improved verification method because it compares the user information to an already existing database, which lessens the possibility of incorrect identification. It provides a reliable means for verifying a user in a credit or debit card system. However, the system fails to implement additional biometric means useful in identifying a called party and fails to apply these features to specific institutional functions.

Still a different system exemplifies the need for a control management and monitoring system in institutional settings. This system discloses a system for controlling, monitoring, recording and reporting telephone communications. The system deals primarily with the identification of a user through use of a PIN and restricting telephone communications through a profile accessed by the PIN. The system further contemplates means for monitoring and recording communications.

Even another system is primarily concerned with incorporating an improved method of monitoring calls. The method includes a means for detecting tones commonly associated with call bridging and call forwarding attempts. For example, the system is directed to the detection of tones such as ring signals, busy signals, special information tones ("SIT"), dual tone multi-frequency, ("DTMF") tones, call progress tones or other similar tones characteristic of the placement of a telephone call. It is limited by detection of certain sounds which may not be readily machine-recognizable. For example, it is foreseeable that interference, background noise, or compressed voice data may inhibit the detection of the tones.

Another system describes a system for the verification of a calling party, called party and a secure connection. The invention includes the costly requirement of secure telephone devices known in the art. Specifically, the invention teaches a system wherein the calling and called parties supply voice data which is encoded and transmitted over a telephone network. Both users hear the alternate party's recorded voice data and verify that the supplied voice data is correct. The call is established only if both parties verify that the called party has provided the correct voice data. However, it would be too costly to implement such a system in a penal institution or similar facility. Additionally, the system does not consider possible payment methods for calls or call management. For example, certain inmates may be entitled to call only a few particular individuals. A system within penal institutions, or similar facilities, must include a means for limiting the number of potential called parties and the specific parties to which inmates can call and provide a means for monitoring inmate call transactions.

Additionally, a system known in the art teaches the ability to utilize voice recognition as an identification means. One aspect of the invention introduces a speaker recognition method and system using two processing units. The first unit receives voice characteristic information by recording specific words spoken by the user. The information is analyzed and stored in a database. The system prompts the user for additional information, which is then received by a second processing unit. The results of the analysis of the second processing unit are sent to a first processing unit with the previously stored information. A comparison of the analyses determines if the user is authorized. Although it contemplates other voice recognition methods, the system fails to address any other field of biometric recognition. The invention is further limited by its inability to manage call restrictions and lacks monitoring capabilities.

Further, a different system discloses a system to permit users repetitive access to a multitude of systems. The system requires an initial enrollment phase for access. The enrollment phase consists of extracting biometric data to be stored for future use. The format of the data is compatible with a plurality of verification/identification systems. For example, in one embodiment, it describes a biometric recognition means including voice recognition, fingerprint identification, and retinal scan identification. However, it does not address restrictions to the system or further monitoring means during use of the system, which are essential for systems within a penal institution.

There is also a system known in the art that discloses the utilization of acoustic and non-acoustic attributes to identify users of a system. An initial profile is created by both utterances spoken by a user and non-acoustic information, such as keying in a user's customer number or social security number. The acoustic recognition contemplates the usage of a plurality of voice recognition methods. The system is limited in its ability for use in a telephonic system in a penal institution by the lack of monitoring or call management abilities.

Finally, a system discloses a method and system for routing calls between an internet protocol ("IP") network and a PSTN. In this system, a first signaling protocol at a first network is routed to a second network that uses a second signaling protocol. It receives requests from a calling party at the first network and translates the request. The system additionally determines the route for processing the request over the second network and generating signals specifying the route.

In view of the foregoing, there clearly exists a need for an improved method and apparatus for managing an institutions telephone call system. Furthermore, there clearly exists a need for an improved telecommunication system for use in penal or similar institutions that incorporates new technologies found in telecommunication systems while maintaining the quality of service and capabilities of current systems. Additionally, a system is needed that supports pre-existing telephony devices already owned and utilized by the institution. Further, the system should also take advantage of the new opportunities afforded through the use of IP telephony. In particular, there exists a need in the art to provide a fully self-contained, digital, computer-based telecommunication system with the capacity to allow an institution to control, record, monitor, and report usage and access to a telephone network.

BRIEF SUMMARY OF THE INVENTION

The present invention embodies a digital telephone call management system. In addition, the present invention incorporates control, monitoring, recording, and reporting means for an institution based telecommunication network. The present invention may implement a debit card platform or other such payment methods. The system of the present invention may be implemented in a variety of facilities including penal institutions or similar facilities such as mental institutions, nursing homes, rehabilitation centers, correctional facilities, government agencies, private and public businesses, and the like.

The present invention provides a fully self-contained, digital telephone call processing platform including a means for identifying and authenticating an institutional calling party. For example, it is foreseeable that these means may include, but not be limited to the use of an institution-assigned inmate specific debit card requiring, inter alia, specific authentication data, the use of biometric recognition devices, and the use of radio frequency identification devices.

The system of the current invention is designed to operate in either a local area network ("LAN") or a wide area network ("WAN"). In a LAN configuration, the telephone system routes calls, performs voice prompts, and responds to menu selections. Calls placed by users of the system are routed through the platform and connected to the proper outgoing trunk based on the type of call placed (e.g., collect, debit, etc.). The platform tests outgoing trunks as calls are placed. If no dial tone is detected, the trunk is taken out of service for a pre-programmed period of time. The platform enables any telephone to access any available outgoing trunk. The platform also has an integrated channel bank, allowing for fully integrated T-1 capability. This allows calls to be processed either over analog or digital trunks as required. The architecture of the platform allows it to accommodate multiple processors, eliminating system overload during extremely busy periods of telephonic communications. The platform may include a site server. This device serves as the main database for the telephone management system. It has the ability to log and record details of all telephone calls placed through the system and store them for a period of time defined by the institution. The site server also digitizes all information for the digital T-1 trunk. A recorder, which may be integral to the system or remote to the system as a separate storage means attached to the site server, is responsible for according the telephone calls and storing them in one or more databases de-pending on the size of the institution or the amount of data which must be archived by the institution and the capability of the storage means. The server may also be remote to the site.

Connected to the site server may be a number of administrative and investigative workstations used to create, edit, and monitor user accounts and telephone calls. The investigative workstations may be used to listen to the outgoing telephone calls in real time or to access calls stored on the server or other type of database or storage means.

In a WAN configuration, the centralized platform is, connected to multiple institutions located at separate sites. In this embodiment, the site server acts as the database location for the entire system. Administrative and investigative workstations may be located at every facility. Alternatively, it is foreseeable that one or more sets of workstations at a central facility may be used to administrate all user accounts.

User-friendly software utilizing a graphical user interface ("GUI") or other types of OSD capable devices may be employed to administer all user accounts of the telephone management system. The software allows a system administrator to provide calling restrictions at all levels of operation. Such restrictions may include the total number of minutes allowed, the total number of calls placed, dates and times calls are allowed, telephone exchanges allowed to be accessed, the number of times the debit inquiry system may be used, and other like restrictions. If a WAN configuration is being used, such restrictions can be set for each institution on the network or for the entire telephone network. In addition, it is contemplated by the present invention that different divisions of each institution, such as cellblocks in a correctional facility, may also be given global restrictions. Since each division of the institution is linked by a LAN/WAN, changes can be made at any of the different institutions and then be applied globally or locally.

Additional restrictions and options are available for individual user accounts. For example, each user may be assigned a language for the telephone system's voice prompts. Another option is the ability to limit the telephone terminals a user may call from or the payment method utilized for each call made.

The called party that a user may contact may also be restricted. For example, certain exchanges or telephone numbers may be blocked. Alternatively, users may have to submit a pre-approved list of numbers to the system administrator. Once the user list has been checked to ensure that the inmate is allowed to call those people, the inmate may only call the people on this list.

Certain options for contacts on the pre-approved list may be set for each person on the list. For example, a language for each person may be set. The voice prompts for that contact will then be in that language. Contacts may also be assigned specific recording restrictions. For example, a conversation between an inmate and an attorney may require specific recording restrictions. Other options, such as if a caller can only place calls collect or by debit, may also be specified.

Another feature of the software is that if can create a debit account for each user and monitor the balance. The amount of each, call maybe subtracted from the account after its completion. Additionally, an account administrator can manually add or subtract funds to individual accounts. The inmate's access to the account is preferably be controlled by the inmate's family. In this configuration; the inmate's family controls the inmate's funds and thereby controls the inmate's access to the account.

Since the server logs data about each call, the present invention is designed to provide reports, either in electric or hard copy form, utilizing specific data from the database. Therefore, a system administrator can track important statistics such as the net profit of the telephone management system during a certain time period, it is foreseeable that the software may incorporate extensive data processing services for providing a user a multitude of correlated dates.

In one embodiment of the present invention, when a user attempts to access his or her account to place a call, the user may be requested, via voice prompts, to select a voice prompt language and enter a user-specific personal identification number. The information entered by the user is compared with information stored in the database for that specific user. If a corresponding PIN match is not achieved, a verification error may be provided and the system may request a re-entry of the PIN. It is foreseeable that if the second attempt fails to provide a match, the individual may be denied access to the telephone system and an official may be notified. Alternatively, the system may be set to allow any number of attempts, such as allowing only one, two or more than two attempts to access the system.

Once the inmate's identity is verified, the system may announce the inmate's call restrictions. For example, the system may access a pre-recorded menu of restrictions informing the inmate of specific restrictions, such as total telephone usage time, individual call length, and different payment options, such as collect call means or debit account means. The system may then connect to the desired called telephone number, provided that the number is on the accessible number list for that user. The system may first prompt the person called to select a language for future voice prompts. The language selected may then be saved in the database. Then, the called party may be informed, via voice prompts or other like means, of the identity of the calling party and location from where the calling party is located.

The called party can accept or reject the caller through voice response, DTMF-tones, or other equivalent input means. If the called party rejects the call, the called party may select an option blocking calls from this caller, institution or similar calls in the future. The data may then be stored in a calling party accessible-number list database. If the called party accepts the call, they may then be prompted to supply information specific to the called party (e.g., social security number, user name, date of birth, etc.). Additionally, the called party may be asked to provide a PIN to be used for future authentication. The information may be used to later identify the called party and verify permission for communication with the calling party. Alternatively, if the called party is on a pie-approved list, the call may proceed without any voice prompts in a similar manner as a normal PSTN telephone call.

The current invention may also utilize other authentication means to provide access to the telephone management system. For example, biometric data may be required to access the system. Biometric data includes but is not limited to, voiceprints, facial architecture, signature architecture, fingerprints, retinal prints, hand geometry, and the infrared pattern of the face. Such data may be acquired from users either from prior supplication to biometric systems or from the acquisition of the data from the user upon the creation of a telephone account for use with the system. This data may be stored along with the user's PIN in the user's account profile or in another storage means to be used later as an authentication device.

When a user attempts to access the telephone system at a later time, the user may hear a series of voice prompts directing the user to first supply a PIN and then supply the same form of biometric information that is stored in the database. For example, if the user's thumbprint was stored digitally in the database, the user would have to supply a thumbprint to a device capable of scanning it and converting the resulting data to the same format as the information in the database. The scanned data would then be compared to the information maintained in the storage database if a positive match occurs based on the PIN and biometric data entered, then the user would be granted access to the system subject to user specific restrictions.

Biometric authentication means may also be implemented to authenticate the called party. In (his type of system, the authentication may include one or more biometric authentication means in addition to non-biometric authentication means. In this embodiment, before the called party is allowed to converse with the caller, the called party may be asked to supply voice authentication and/or provide a PIN. This information may be stored in a database either prior to a user's first call or when the first call is made. If the data has been stored prior to the call, the called party would have to state the pre-recorded phrase. The recorded data would then be compared with information in the database. If the data is in compliance with the information in the database to within some pre-assigned statistical threshold, the system would allow the call to proceed and a connection would be made. If the data had not been stored prior to the call, it would be retrieved from the called party and used for future voice authentication.

A further authentication means that may be utilized by the present invention is the use of radio frequency ("RF") authentication. The user may be required to have in the user's possession some type of radio frequency identification ("RFID") technology to access the telephone system. This may be accomplished in a number of ways.

In a first example, each user of the system would be required to wear an RF band attached preferably to the ankle or wrist. The RF band may be active, passive, or neutral. The frequency of the band is preferably unique to each wearer. An active RF band contains a transponder that either intermittently or constantly emits an RF pulse that is detected by a series of sensors placed about the user's location. The sensors relay the detected data to a remote or central database containing a processor that calculates the location of the wearer in one of two usual methods known in the art, as well as those methods not yet contemplated.

The first method involves triangulating the user's source, which requires two or more sensors or a sensor on a rotating platform. The analyzing system detects the angle of the incident pulse with the sensor and uses this data from multiple detectors to triangulate the source of the user.

A second method of detection involves the analysis of the time of flight of the emitted RF pulse. This method requires the same sensor configuration as the triangulation method. In this method, the sensor measures the time it takes each pulse to arrive at the sensor location as compared to the pulses that occur at a regular rate in an active RF device. From this data, the analyzing system can determine an accurate distance from the sensor that the user must be located within some minor degree of error. By combining this information from a multitude of sensors, the location of the person can triangulated.

Active RF bands may be used in the present invention to locate an individual within the facility housing the telephone system. When an individual attempts to access a telephone terminal, the system can determine the user accessing the terminal since the location of each individual is known. The phone terminal allowing the user to place a call can then use the options for that specific individual.

It is advantageous to use active RF bands because they are very accurate for determining the location of an individual. However, most active systems have a relatively short battery life and require constant recharging. A passive RF device may also be used with only slight modification to the system. A passive RF device works by emitting a pulse only when activated by some other emitted pulse. In this embodiment, the sensors may also be equipped with RF pulsing devices designed to activate the user's RF devices. When a user attempts to access a telephone terminal, the system sends out a pulse. As a result, the user's RF device is activated and the person using the telephone terminal is authenticated. The user's specific user options can then be forwarded to the telephone terminal the user is utilizing.

Passive RF bands may be used in conjunction with the present invention for a variety of applications. For example, each telephone may be located in its own booth and fitted with an RF emitter and sensor. When a person attempts to access a telephone account at a terminal, an emitter terminal can send out a pulse activating a passive RF user device. In turn, the RF device may emit a responsive pulse. Subsequently, the sensor on the terminal can detect the responsive pulse. Using time of arrival analysis, the user can be located and verified, thereby authenticating the telephone terminal.

Neutral RF bands may also be used in the present invention. Neutral RF bands function by reflecting an incident RF pulse with a slight modulation, which is unique to each user. In response, the sensor on the telephone terminal can record the reflected wave and forward the information to analyzing software. The analyzing software subtracts off the original pulse signal to determine the modulation frequency of the user's RF band, thereby authenticating the user at the terminal. The correct user options can then be supplied to that specific terminal.

In another example of the present invention, a debit card may be used in conjunction with a PIN in the present invention. At each terminal, the user may be instructed to scan a user-specific debit card into a debit card reader and enter a corresponding PIN in order to gain access to the system. Alternatively, a user may enter information related to a debit card in any of a number of known procedures followed by a PIN. This method of authentication may also be combined with biometric and/or RF identification means.

After a user is authenticated and a calling party is contacted, the present invention provides for a number of monitoring and safety means that are active when a call is in progress. Call recording is the primary security means. There are three types of call recording utilized by the present invention. However, numerous other call recording systems in accordance with the concepts and objectives of the present invention may be incorporated.

In a first call recording protocol, by default, all calls are logged and recorded unless it is specified in a user's contact file (e.g., calls to an attorney). It is foreseeable that calls may be archived on a site server or other database storage means for future reference.

A second type of call recording implemented is referred to as passive recording. This type of recording may utilize voice recognition software to listen for certain keywords or phrases in a conversation. If a key word is uttered, the system records the rest of the call and alerts the system administrator, proper authorities or implements other security procedures. For example, in a penitentiary, if the word "drugs" is used in a conversation, the system may be activated thereby recording the remainder of the conversation.

Another type of call recording that may be utilized in the present invention involves an operator scan of a user conversation. In response to a flagged conversation, the operator may have the discretion to selectively record the conversation. For example, using the same software used to administrate accounts, an operator can selectively listen in on user conversations and record suspicious conversations for future reference.

Third-party call detection is another security feature that the present invention may utilize. The system software may have the ability to detect whether a third party is connected upon the origination of the call. If a third line is detected, but not authorized, the software will end the communication and notify the authorities that such an event has occurred. The telephone management system may also include a feature that terminates the telephone call if more then a certain number of individuals are included in the conversation. It is foreseeable that this may be accomplished by voice recognition means.

Another type of third-party call detection involves the detection of hook-flash events. A hook-flash event occurs when a user hangs up the telephone for only a brief instant during a telephone call, just long enough to not disconnect the line. This is usually characteristic of a switch between lines on call waiting or to initiate a three-way conference call. If the telephone system's software detects a hook-flash event by either party to the call, it will terminate the call and alert the authorities. This feature of the system prevents unauthorized third parties from taking part in telephone conversations.

An additional security means incorporated in the present invention is the locking of the telephone keypad after a connection is made. This prevents the caller from possibly dialing out to a third party that has not been approved after a pre-approved connection has been made. Alternatively, the system may allow the user to press a predetermined number of keys after a connection has been made. This allows an authorized user to access an automated service and enter menu selection keys.

The human voice has the capability of creating DTMF tones also. In order to differentiate tones created by a user's voice from tones created by the telephone keypad, the present invention incorporates software, which monitors the frequency of DTMF tones. Such software is capable of determining the source of the DTMF tones.

Therefore, it is an object of the present invention to provide an efficient and reliable user identification system through use of such means as personal identification numbers (PIN), radio frequency identification (RFID) technology, and biometric measures.

Another object of the present invention is to provide a digital telephone call management system.

Yet another object of the present invention is to provide a telephone communication monitoring system.

Further, an object of the present invention is to provide a centralized platform for a digital call management system.

An additional object of the present invention is to provide a digital call management system using a user-friendly operating system.

Still another object of the present invention is to provide a digital call management system capable of operating in a Local Area Network (LAN) or Wide Area Network (WAN).

A further object of the present invention is to permit changes to call restrictions and options through a computer control unit.

Yet a further object of the present invention is to provide a means of restricting communication options to certain users.

A different object of the present invention is to allow institutions to support their pre-existing devices while taking advantage of the new opportunities afforded through the use of IP telephony.

A still different object of the present invention is to operate over a Public Switched Telephone Network (PSTN).

An additional object of the present invention is to incorporate billing means such as a debit card system.

Yet another object of the present invention is to provide called parties with the option of rejecting a call and blocking similar calls in the future.

Still another object of the present invention is to provide a digital call management system where no degradation of service or capability occurs regardless of whether the system is located on or off site.

Finally, an object of the present invention is to incorporate advanced, user-friendly software for monitoring, controlling, recording, and billing.

BRIEF DESCRIPTION OF THE DRAWINGS/FIGURES

A further understanding of the present invention can be obtained by reference to a preferred embodiment set forth in the illustrations of the accompanying drawings. Although the illustrated embodiment is merely exemplary of systems for carrying out the present invention, both the organization and method of operation of the invention, in general, together with further objectives and advantages thereof, may be more easily understood by reference to the drawings and the following description. The drawings are not intended to limit the scope of this invention, which is set forth with particularity in the claims as appended or as subsequently amended, but merely to clarify and exemplify the invention.

For a more complete understanding of the present invention, reference is now made to the following drawings in which.

DETAILED DESCRIPTION OF THE INVENTION

As required, a detailed illustrative embodiment of the present invention is disclosed herein. However, techniques, systems and operating structures in accordance with the present invention may be embodied in a wide variety of forms and modes, some of which may be quite different from those in the disclosed embodiment. Consequently, the specific structural and functional details disclosed herein are merely representative, yet in that regard, they are deemed to afford the best embodiment for purposes of disclosure and to provide a basis for the claims herein, which define the scope of the present invention. The following presents a detailed description of the preferred embodiment (as well as some alternative embodiments) of the present invention.

Figure 1:
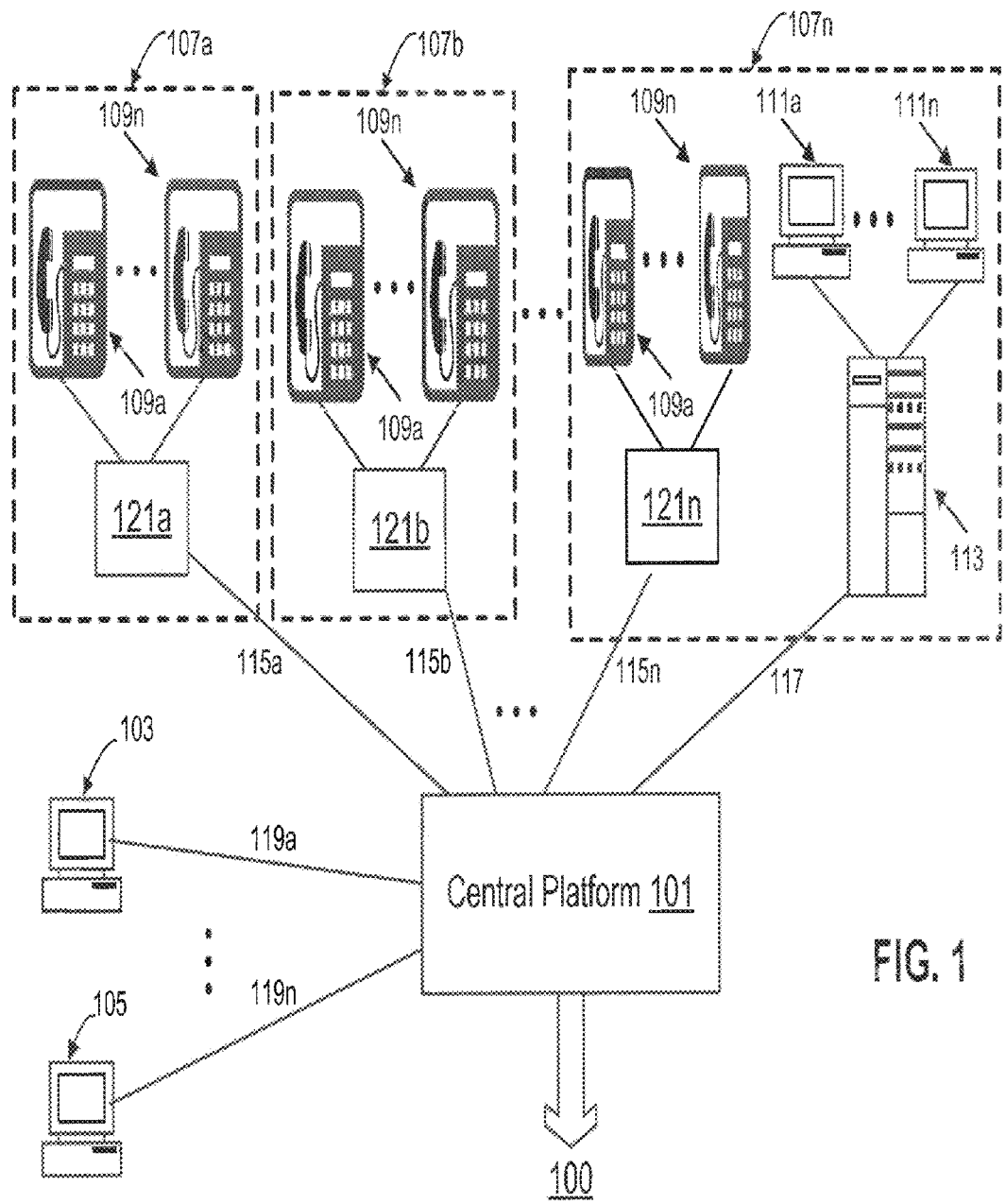
FIG. 1 depicts a block diagram of preferred embodiment of the digital, centralized call management system of the present invention operating over a PSTN.

Referring first to FIG. 1, depicted is a block diagram of the preferred embodiment of the present invention showing the centralized set up of the call management system operating over a PSTN. The central call management platform 101 connects to routers 121a-n at sites 107a-n via connections 115a-n, respectively. Connections 105a-n preferably operate over a PSTN. Sites 107a-n contain telephonic instruments 109a-n. Additionally, site 107n contains workstations 111a-n connected to server 113. Although only depicted in site 107n of FIG. 1, all sites 107a-n can include one or more workstations and/or servers. Workstations 111a-n and server 113 communicate with the telephonic instruments 109a-n at site 107n. Further, workstations 111a-n and server 113 can connect to central platform 101 via connection 117. Connection 117 preferably sends data via a Virtual Private Network ("VPN"), but other data transfer methods are foreseeable. Also connected to central platform 101 are investigative workstation 103 and administrative workstation 105 via connections 119a and 119n, respectively. Although only one investigative workstation 103 and one administrative workstation 105 are shown, the system is capable of including a plurality of investigative and administrative workstations. Further, central platform 101 is configured to preferably operate over a WAN.

For simplicity, reference is now made to the setup for site 107a. The same setup holds for sites 107b-n. A plurality of user telephonic instruments 109a-n, wherein the actual number of telephonic instruments depends on the desired capacity of the institution call system, are incorporated at site 107a. Telephonic instruments 109a-n are connected to router 121a. It is preferable that telephonic instruments 109a-n contain a central telephone bank (not shown) located within a facility to allow for centralized monitoring. However, it is foreseeable that the telephone bank may be located at a multitude of locations internal or external to a facility to allow for efficient monitoring. Each telephonic instrument 109a-n can be equipped with a biometric sensor and/or RFID technology, as disclosed in application Ser. No. 10/215,367, which is incorporated herein by reference.

Router 121a routes attempted calls to central platform 101 via connection 115a. Multiple processors may be incorporated into central platform 101. This allows call processing even after parallel component failure. The architecture also provides for a sharing of load between processors, which eliminates overload during extremely busy periods. The multiple processors enable the system to handle large call volumes at any time. Additionally, the multiple processors ensure system integration.

Central platform 101 performs the voice prompts heard by the inmate and the recipient of the call allowing the parties to respond to menu selections. Central platform 101 further connects to PSTN 100, which preferably operates similarly to connections 115a-n. Central platform 101 also digitizes telephone audio for recording or for biometric voice identification purposes. Additionally, central platform 101 digitizes user call information for efficient transfer and record keeping. It is preferred that central platform 101 stores the digitized audio used for voice prompts as well as each user's call restrictions, PIN, biometric verification data, etc. However, alternatively, depending on memory requirements, the data may be stored by server 113 or other servers, located either on or off site.

Central platform 101 also incorporates a digital audio recording means. The digital audio recording means of central platform 101 may alternatively be located onsite. It records the conversations controlled by the call management system. The audio recording means may be activated for each call unless the number being called is specifically flagged for no recording or monitoring, such as calls protected by attorney-client privilege. Additionally, the audio recording means can monitor multiple telephone lines simultaneously.

Central platform 101 is preferably controlled by software associated with administrative workstation 105 via connection 119n. In the preferred embodiment, administrative workstation 105 is connected to central platform 101 via a LAN. However, it is foreseeable that other electronic connections, such as a WAN, may be employed. The software of administrative workstation 105 can modify call restrictions for individual users in addition to all telecommunication activity of each site. Additionally, the software can also track a user's commissary information, such as the account balance when a debit system is used. Further, the software as necessary may also perform other functions.

Administrative workstation 105 also manages and records a user's financial transactions. It can further record other financial information, such as the total amount spent on collect calls by each user, amount spent on debit calls by each user, the total net financial transactions for each user, etc. These functions may alternatively be performed by a commissary workstation (not shown).

Furthermore, administrative workstation 105 can also utilize a live operator to monitor calls without detection. It is foreseeable that this function may be performed by software associated with administrative workstation 105. The software provides a means for patching into a call using circuitry without alerting the user or called party to the operator's presence. If the operator finds that a call being monitored is suspicious, the operator may manually activate the aforementioned audio recording means to record the call.

At this time, future monitoring of the user may also be set up. In an alternative embodiment, the call management system also includes a shadow workstation to perform this monitoring. Alternatively, software located at central platform 101 or workstations 103 or 105 may be used to passively monitor calls using such means as keyword detection, wherein when a keyword or phrase is spoken, software may activate the audio recording means and alert the proper authorities that a violation has occurred.

The system further includes investigative workstation 103 connected to central platform 101 via connection 119a. Preferably, investigative workstation 103 is connected to central platform 101 over a LAN. However, it is foreseeable that other connections may be utilized without departing from the spirit of the invention. Investigative workstation controls monitoring and security features interfaced in the call management system.

The features of investigative workstation 103 can be alternatively incorporated into administrative workstation 105. Administrative workstation 105 and investigation workstation 103 may be combined into one unit or further separated into additional units. Further, the workstations may be located locally or remotely to central platform 101. Also, the workstations may be alternatively located onsite at the institution.

Figure 2:
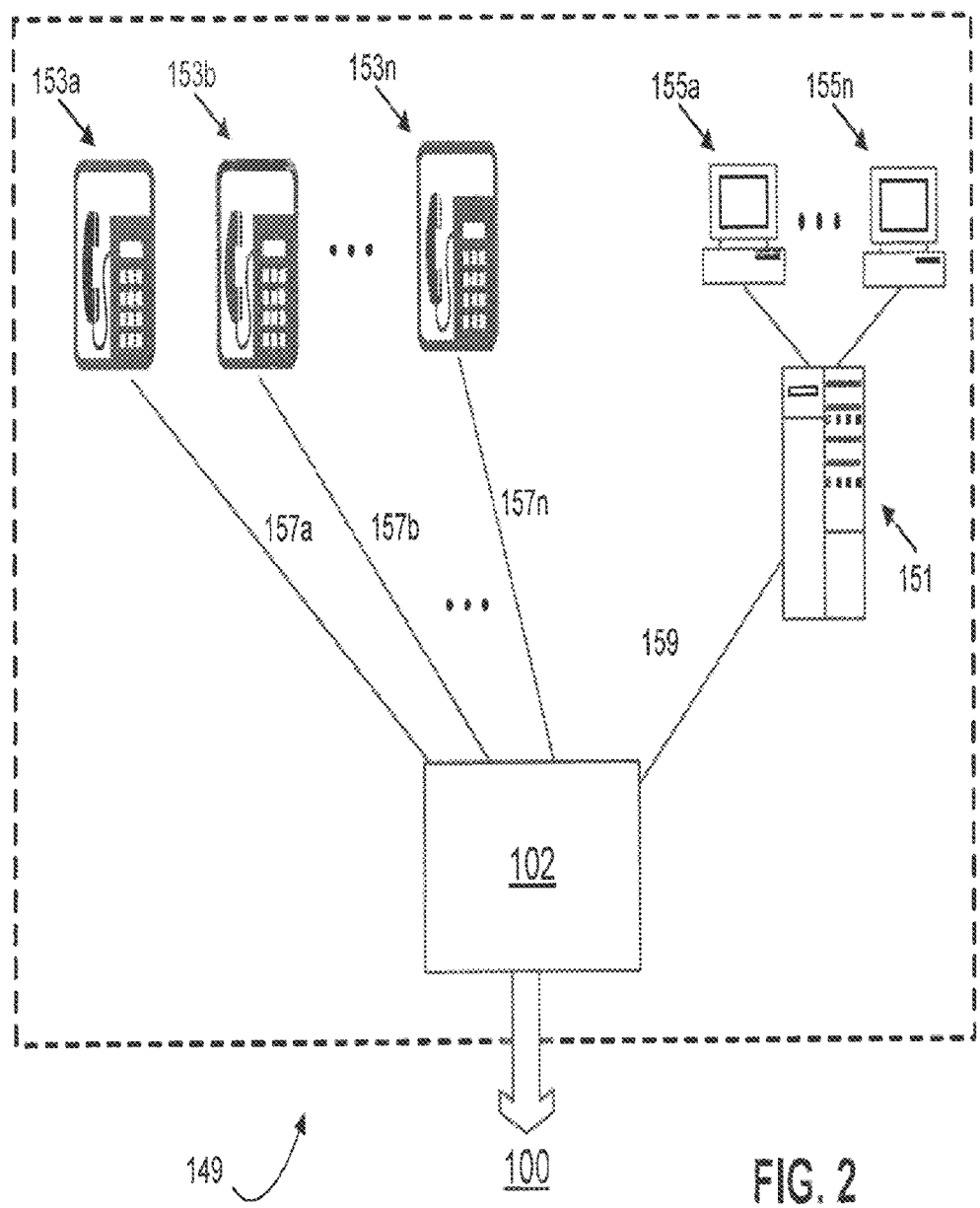
FIG. 2 depicts a block diagram of an alternative embodiment of present invention for a site-based, digital call management system operating over a PSTN.

Next, FIG. 2 depicts an alternative embodiment of the present invention showing a site-based call management system operating over a PSTN. Site 149 contains telephonic instruments 153a-n, workstations 155a-n, server 151, and platform 102. The functionality of platform 102 is similar to that of central platform 101, except that platform 102 is located onsite, as opposed the off-site location of central platform 101. Platform 102 further sends calls to PSTN 100 preferably via a T-1 connection. Although a T-1 connection is preferable, other connections, such as using analog facilities, are foreseeable. Telephonic instruments 153a-n are connected to platform 102 via connections 157a-n. Platform 102 contains routing means similar to that of routers 121a-n in FIG. 1. Alternatively, the routing means may be stand-alone-and connect to platform 102. Workstations 155a-n connect to server 151, which further connects to platform 102. Alternatively, workstations 155a-n can connect directly to platform 102. Workstations 155a-n are capable of performing the same functions as workstations 103 and 105 of FIG. 1.

Figure 3:
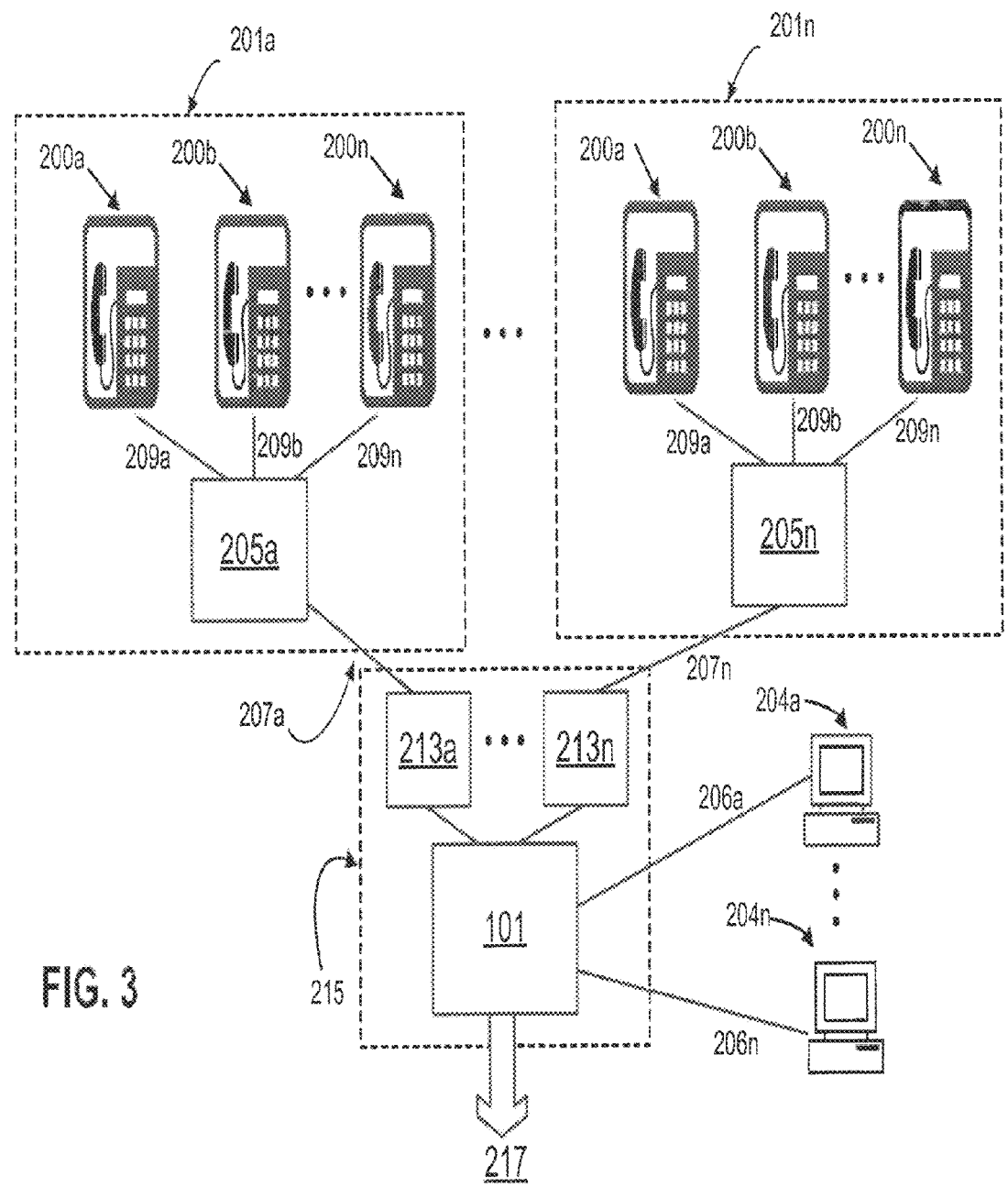
FIG. 3 depicts a block diagram of the preferred embodiment of the centralized system of the present invention using a Voice over Internet Protocol ("VoiP") infrastructure.

Referring next to FIG. 3, depicted is the preferred embodiment of the centralized call management system using VOIP. Each site 201a-n preferably contains at least telephonic instruments 200a-n and gateway 205a-n. Central site 215 contains routers 213a-n and central platform 101. Routers 213a-n may be stand alone or incorporated into central platform 101. Workstations 204a-n are connected to central platform 101 via connections 206a-n. Central platform 101 and workstations 204a-n are preferably connected via a LAN, although other connections are foreseeable. Alternatively, each site 201a-n may contain workstations. Workstations 204a-n are capable of the same functions as the aforementioned workstations 103 and 105 of FIG. 1.

Reference is now made to site 201a. The setup up for other sites 201b-n is the same as for site 201a. Discussion is limited to 201a for simplicity. Telephonic instruments 200a-n connect to gateway 205a. Gateway 205a can further include routing means. Gateway 205a allows for operation in a mixed environment. It allows the site to support pre-existing equipment while taking advantage of new opportunities afforded through the use of IP telephony. Gateway 205a connects to router 213a via connection 207a.

Connection 207a is preferably a VOIP Frame Relay. At this point, proper VOIP protocol is applied via a frame relay. Gateway 205a allows the institution to utilize IP telephony without having to purchase IP telephonic instruments (i.e., gateway 205a allows the support of pre-existing analog equipment). Router 213a further sends the call to the digital central platform 101 for further processing, monitoring, etc. The call is then sent out over a VOIP infrastructure 217.

Figure 4:
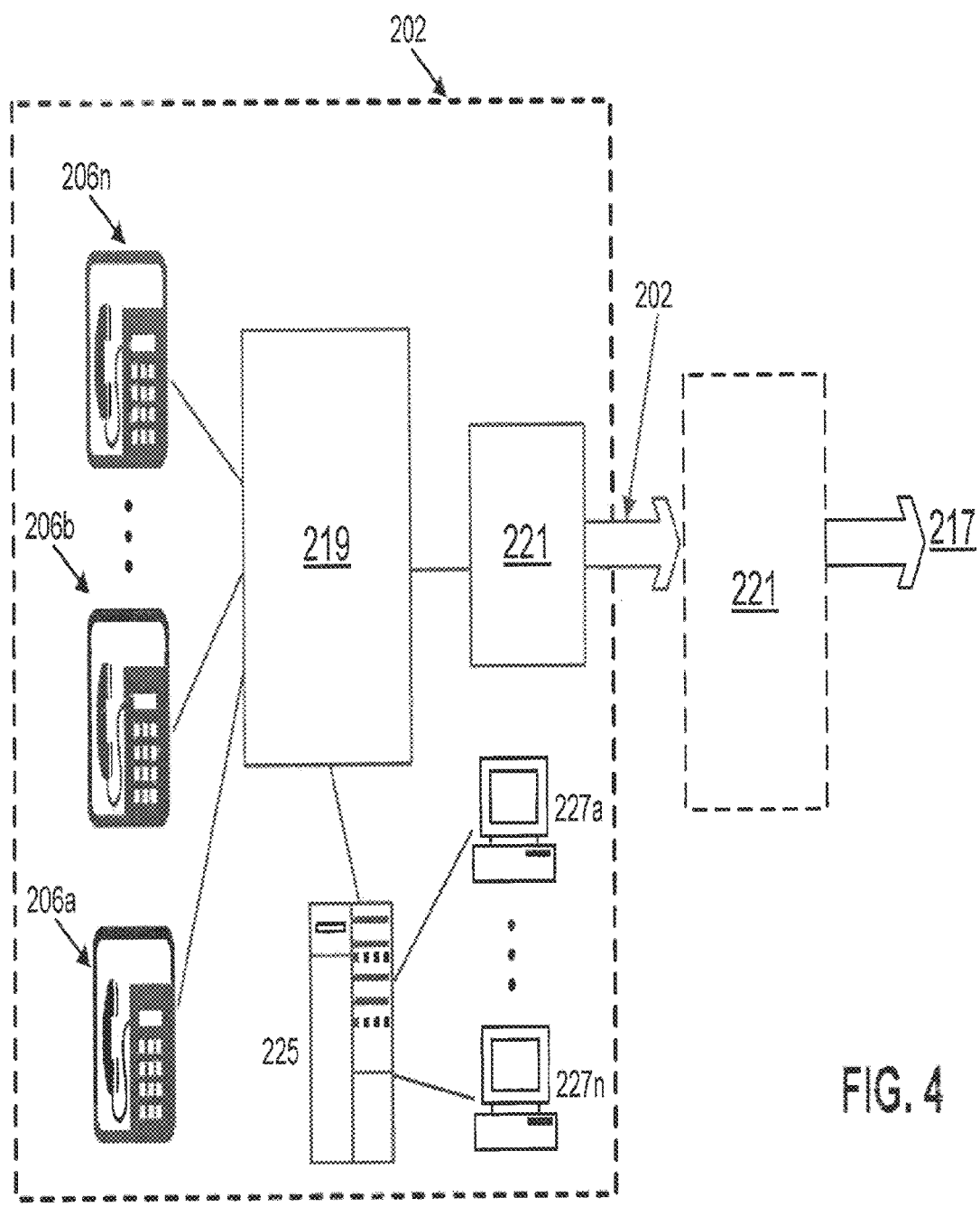
FIG. 4 depicts a block diagram of an alternative embodiment for a site-based system using a VOIP infrastructure.

FIG. 4 depicts an alternative embodiment of the present invention showing a site-based call management system utilizing VOIP. Site 202 contains telephonic instruments 206a-n, platform 219, router 221, server 225, and workstations 227a-n. Telephonic instruments 206a-n are connected to platform 219. Further, site 202 may additionally include server 225 connected to platform 219. A plurality of workstations 227a-n are connected to server 225. Router 221 is connected to platform 219. Alternatively, router 221 may be internal to platform 219. Platform 219 preferably includes a High Density Station Interface ("HDSI") Card access and an IP link card egress. One skilled in the art will acknowledge that other such access and egress means are foreseeable. Router 221 routes the signal using VOIP 200 to network 204. Network 204 is preferably a T1 connection. However, other connections are foreseeable. Finally, the signal is sent over VOIP infrastructure 217.

What is claimed is:

1. An inmate telecommunication call processing system, comprising:
   a telephone terminal configured to allow a user to attempt to place a telephone call to a call recipient; and
   a central platform configured to process the call attempt, the processing including:
      prompting the user;
      receiving non-biometric information of the user that uniquely identifies an individual;
      selecting a stored biometric record of the individual associated with the non-biometric information;
      receiving biometric information of the user;
      comparing the received biometric information only to biometric information included in the selected stored biometric record; and
      determining, based on the comparison, whether to allow or deny the call attempt,
   wherein the non-biometric information and the biometric information are extracted from a single response to a single prompt.

2. The inmate telecommunication call processing system of claim 1, wherein the telephone terminal is located within a facility, and
   wherein the central platform is located at a remote location.

3. The inmate telecommunication call processing system of claim 1, wherein the prompting prompts the user to enter the biometric information.

4. The inmate telecommunication call processing system of claim 3, wherein the prompting includes requesting that the user speak a predetermined word or phrase, and
   wherein the biometric information is voice information.

5. The inmate telecommunication call processing system of claim 1, wherein the central platform is configured to extract voice biometric information of the user from the single response.

6. The inmate telecommunication call processing system of claim 5, wherein the voice biometric information is extracted from the user's vocal responses to other call setup prompts.

7. The inmate telecommunication call processing system of claim 6, wherein the voice biometric information is extracted from the user's response to a prompt to state a PIN belonging to the user.

8. A method of authentication within an inmate telephone system, the method comprising:
   prompting a user;
   receiving a call attempt, including call recipient information, from the user;
   receiving non-biometric information of the user that uniquely identifies an individual;
   selecting a stored biometric record containing biometric information corresponding to the individual associated with the non-biometric information;
   receiving biometric information of the user;
   comparing the received biometric information only to the biometric information of the stored biometric record;
   in response to determining that the received biometric information is a statistical match to the stored biometric information, retrieving call restrictions of the user;
   connecting the call attempt to a call recipient in response to determining, based on the retrieved call restrictions, that the user is permitted to contact the call recipient,
   wherein the non-biometric information and the biometric information are extracted from a single response to a single prompt.

9. The method of claim 8, further comprising:
   receiving the non-biometric identifying information from the user;
   selecting, as the stored biometric record, a single biometric information object corresponding to an identity associated with the non-biometric information,
   wherein the comparing compares the received biometric information only to the selected single biometric information object.

10. The method of claim 9, wherein the non-biometric identifying information is a PIN, and
    wherein the biometric information is voice biometric information.

11. The method of claim 8, further comprising:
    determining, based on the retrieved call restrictions and the call recipient information, whether recording the call is permitted; and
    recording the call based on the determination.

12. The method of claim 8, further comprising:
    receiving authentication information of the call recipient;
    comparing the authentication information to stored authentication information; and
    allowing the call in response to determining that the authentication information is a statistical match to the stored authentication information.

13. The method of claim 12, wherein the stored authentication information is selected according to the call recipient information received with the call attempt.

14. The method of claim 12, further comprising:
    during the call, periodically extracting biometric information from participants to the allowed call;
    comparing the extracted biometric information to biometric information associated with the user and the call recipient; and
    terminating the call in response to determining that the extracted biometric information does not match the biometric information of the user or the call recipient.

15. A call processing system, comprising:
    a central call processing platform in having one or more circuits and/or processors configured to:

receive a call attempt, including call recipient information, from a user;
prompt the user;
receive non-biometric information of the user, the non-biometric information being uniquely associated with an individual;
select a stored biometric record corresponding to the individual associated with the received non-biometric information;
receive biometric information of the user;
compare the received biometric information only to biometric information included in the selected biometric record;
in response to determining that the received biometric information is a statistical match to the biometric information included in the selected biometric record, retrieve call restrictions of the user;
connect the call attempt to a call recipient in response to determining, based on the retrieved call restrictions, that the user is permitted to contact the call recipient,
wherein the non-biometric information and the biometric information are extracted from a single response to a single prompt.

16. The method of claim 12, further comprising:
after connecting the call, periodically extracting biometric information from a participant to the allowed call;
comparing the extracted biometric information to biometric information associated with the user; and
terminating the call in response to determining that the extracted biometric information does not match the biometric information of the user.

17. The method of claim 12, further comprising:
after connecting the call, periodically extracting biometric information from a participant to the allowed call;
comparing the extracted biometric information to biometric information associated with the call recipient; and
terminating the call in response to determining that the extracted biometric information does not match the biometric information of the user.

18. The call processing system of claim 15, wherein the one or more circuits and/or processors are further configured to:
select, as the stored biometric record, a single biometric information object corresponding to an identity associated with the non-biometric identifying information,
wherein the comparing compares the received biometric information only to the selected single biometric information object,
wherein the non-biometric identifying information is a PIN, and
wherein the biometric information is voice biometric information.

19. The call processing system of claim 15, wherein the one or more circuits and/or processors are further configured to:
determine, based on the retrieved call restrictions and the call recipient, whether recording the call is permitted; and
record the call based on the determination.

20. The call processing system of claim 15, wherein the one or more circuits and/or processors are further configured to:
receive authentication information of the call recipient;
compare the authentication information to stored authentication information; and
allow the call in response to determining that the authentication information is a statistical match to the stored authentication information.

21. The call processing system of claim 18, wherein the stored authentication information is selected according to the call recipient information received with the call attempt.

22. The call processing system of claim 19, wherein the one or more circuits and/or processors are further configured to:
periodically extract biometric information from participants to the allowed call;
compare the extracted biometric information to biometric information associated with the user and the call recipient; and
terminate the call in response to determining that the extracted biometric information does not match the biometric information of the user or the call recipient.

* * * * *